United States Patent [19]

Peters, Jr.

[11] 4,223,183
[45] Sep. 16, 1980

[54] TELEPHONE CONTROLLED ORDER ENTRY SYSTEM

[76] Inventor: Charles O. Peters, Jr., Rte. #2, Box 3595, Porter, Tex. 77365

[21] Appl. No.: 966,035

[22] Filed: Dec. 4, 1978

[51] Int. Cl.² ............................................ H04M 11/06
[52] U.S. Cl. ............................. 179/2 DP; 179/84 VF
[58] Field of Search .................. 179/2 DP, 2 A, 6 R, 179/6 E, 84 VF

[56] References Cited

U.S. PATENT DOCUMENTS

| | | | |
|---|---|---|---|
| 3,870,821 | 3/1975 | Steury | 179/2 DP |
| 4,121,052 | 10/1978 | Richard | 179/2 DP |

Primary Examiner—John H. Wolff
Assistant Examiner—Joseph A. Popek
Attorney, Agent, or Firm—Arthur M. Dula

[57] ABSTRACT

A recordkeeping apparatus for use with a pushbutton telephone communication system for providing a permanent printed record at a called party's station of a pushbutton telephone transmitting station optionally equipped with a source terminal to display the transmitted data and a receiving station connected to the telephone communication system. The receiving station includes an answering circuit to detect incoming calls, a tone decoder to decode the transmitted character data and "#" and "*" function data, storage for the character data, a time and date clock, a printer interface, a printer to print the time and date and character data, and a programmer. The programmer controls printing of the time and date, printing of the transmitted character data, and elimination of erroneous character data, all in response to the "#" and "*" function data received from the transmitting station.

10 Claims, 19 Drawing Figures

LOGIC-POWER SUPPLY
PRINTER TERMINAL

LOGIC-INPUT FILTER, OSC AND ANSWERING PRINTER TERMINAL (SHT. 1 OF 2)

LOGIC- INPUT FILTER, OSC AND ANSWERING PRINTER TERMINAL (SHT. 2 OF 2)

LOGIC PROGRAMMER PRINTER TERMINAL (SHT. 1 OF 2)

LOGIC PROGRAMMER PRINTER TERMINAL (SHT. 2 OF 2)

LOGIC CLOCK
PRINTER TERMINAL
(SHT. 2 OF 2)

LOGIC-POWER SUPPLY SOURCE TERMINAL

TELEPHONE CONTROLLED ORDER ENTRY SYSTEM

BACKGROUND OF THE INVENTION

1. Field of the Invention

The present invention relates generally to an apparatus for providing a printed record of data transmitted over common carrier communication lines from a pushbutton telephone. More particularly, the present invention relates to a printer/recorder apparatus adapted to make a permanent record of numeric information transmitted from a standard pushbutton telephone.

2. Background of the Prior Art

Facsimile, teletype and telescribe communications systems have been developed for transmitting orders from a plurality of outlying order-initiating stations to a central depot. Many of these systems use audio tones within the frequency range of audio tones used in a standard Touch Tone TM telephone because this regime affords compatability with common carrier communication lines. All prior art systems, however, require complex apparatus to encode information at a transmitting station and further require complex and expensive equipment to decode transmitted information at a receiving depot. Because of these limitations, such systems are used only by large corporations and have heretofore been economically unavailable to the general small businessman who must order his goods from a central supply point.

The prior art also teaches use of a standard 12-button Touch Tone TM telephone to transmit information over common carrier lines to a central computing facility. This art uses a telephone as a remote data terminal. It is also well known to provide a printer/recording apparatus located at an unattended telephone receiving station to record alphanumeric data from a pushbutton telephone encoded according to an arbitrary coding scheme. All prior art known to the applicant requires either a sophisticated computing system at the receiving station or use of a complex arbitrary coding scheme to allow the transmission of alphanumeric data from the Touch Tone TM pad of the telephone. The computer system is too expensive to be used by most small businesses and any system that uses an encoding scheme is too complex and prone to error to be used by lay operators. Because of these deficiencies in the prior art, no inexpensive, simple to operate, printed record order system had been developed that can be used by untrained operators of small businesses on a routine basis.

In virtually all situations where a plurality of outlying users place orders with a central supply depot, it is desirable to queue the orders and to provide a permanent indication of the time the order was placed so the supply depot can fill orders within a reasonable time and on a first-come, first-serve basis.

Prior to the development of electronic telephone switching systems, several systems were developed for providing a printed record or other visible indication at the called station of the number of a calling party or other information transmitted by the calling party. These early devices required special equipment at the telephone company's central station in addition to recording and display equipment at the receiving station. The prior art also reflects a number of specialized telephone data transmission and control systems that use specialized input and output devices. These include telegraph, facsimile and teletypewriter systems.

In Scantlin, U.S. Pat. No. 3,371,172, a communications system is disclosed utilizing a pushbutton telephone for transmission of pulse trains containing digital data to a called party's location. There a tone decoder is employed to convert tone trains into electrical impulses for controlling the operation of an information unit. Morgan, U.S. Pat. No. 3,515,814, describes how a pushbutton telephone may be used as the data communications link between an input terminal and a remote computer. Goldstein, U.S. Pat. No. 3,557,311, shows an input keyboard coupled to an associated printer for transmission of alphanumeric data from a pushbutton telephone and recording at the calling party's station of the transmitted message. Finally, Flanagan et al, U.S. Pat. No. 3,675,513, describes a pushbutton telephone transmission system comprising a modified typewriter coupled to a receiving station for providing a permanent record of data transmitted by the user at the sending station. The message may be input to the system either through a modified typewriter for automatically coding messages to be sent over the telephone or, alternatively, direct inputting of the message through manual actuation of the dial buttons on a pushbutton telephone set.

The closest prior art known to the inventor of the present invention is U.S. Pat. No. 3,870,821, which was issued Mar. 11, 1975 to Steury. Steury teaches a printer/recorder apparatus for use with a 12 or 16-key pushbutton telephone communication system wherein a relatively complex arbitrary code comprising two code groups, each group having a plurality of sub-groups, is used to transmit alphanumeric information to a remote unattended printer.

SUMMARY OF THE PRESENT INVENTION

The present invention is an improved apparatus for making a printed record automatically at a central station of the general type described in the aforementioned Steury patent. In lieu of the arbitrary and complex coding system required by Steury, the present invention includes an apparatus electrically connected to the phone lines for automatically detecting and receiving a message from any Touch Tone TM telephone and further discloses means for logging the time and numeric data transmitted by the remote telephone. The simplicity of operation and reduction in size, complexity and cost of equipment resulting from eliminating the coding system used by Steury permits the present invention to provide a practical, low-cost order collection system for use by small businesses.

The present invention also teaches the optional use of a display only station proximate the sending telephone. When used, this display only station provides the sender with the ability to verify: (1) that the receiving station is ready for the message, and (2) that the data transmitted from the remote location to the central office is correct.

It is therefore the principal object of the present invention to provide a simple and inexpensive printing apparatus for use with a pushbutton telephone system which can be used by relatively untrained operators to record order information from outlying Touch Tone TM telephones at an unattended central station.

It is a further object of the present invention to provide such an order logging system that records the time each order is placed with the pertinent order information.

The foregoing features and objects of the present invention are not to be considered limiting. The best embodiment of the invention known to the inventors is detailed below, but the present invention should be understood to be limited only by the scope of the appended claims and their equivalents.

DETAILED DESCRIPTION OF THE PREFERRED EMBODIMENT

Figure 1:
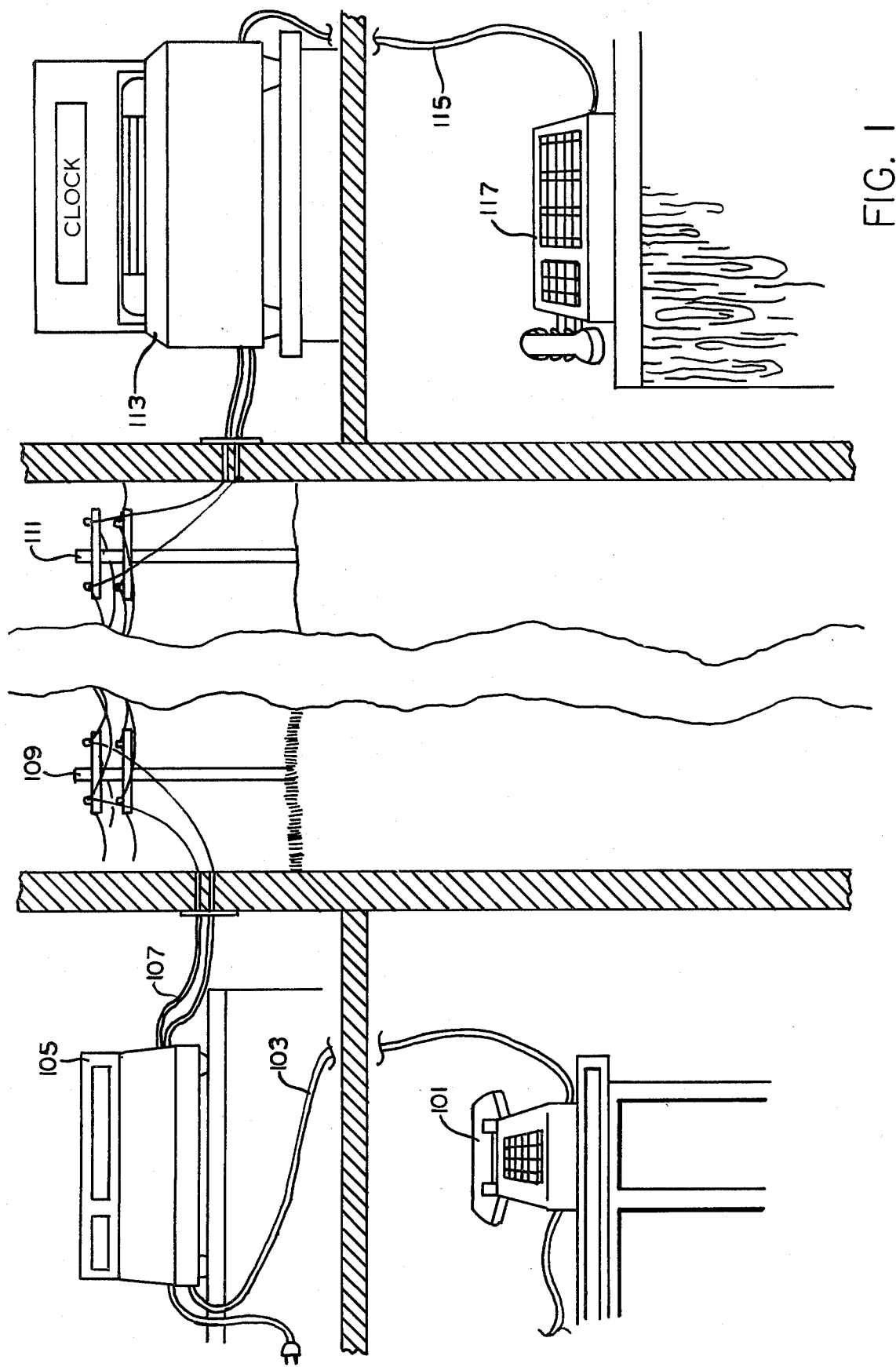
FIG. 1 is a drawing showing the components of the order recording system taught by the preferred embodiment of the present invention.

FIG. 1 is a pictogram showing the component elements of an order system as taught by the preferred embodiment of the present invention.

Telephone 101 is connected by cable 103 to source terminal 105. Source terminal 105 is connected through lines 107 to a switched common carrier network e.g. indicated metaphorically as telephone poles 109. The central office switching equipment is not shown in this figure.

At the receiving station, common carrier lines 111 are connected to printer terminal 113, which is connected by line 115 to a receiving Touch Tone TM telephone 117.

Strictly speaking neither receiving telephone 117 nor source terminal 105 is necessary to provide an automatic hard copy order system. Telephone 101 may be directly connected to the common carrier lines and may, in fact, be any unmodified touch tone telephone. Printer terminal 113 has the capacity to stand alone. It need not be hooked to a phone.

To operate the system, the receiver of Touch Tone TM phone 101 is lifted and the number associated with receiving telephone 117 is dialed. Printer terminal 113 answers the telephone. The person placing the order then pushes the asterisk key on phone 101. This causes printer terminal 113 to print the time and date in red. A number would then be entered identifying the person placing the order. After this number the person placing the order would push the # on the Touch Tone TM pad of telephone 101. This key causes the printer to advance a line. The person using the system would then enter numeric data indicating the quantity and number of the part or other item he was ordering. To terminate the order, the operator may push the # key twice or merely hang up. After approximately 15 seconds the common carrier will return a dial tone to printer terminal 113 and the system will disconnect. Source terminal 105 allows the person placing an order to visually observe the digits he is transmitting prior to the time they are printed at printer terminal 113.

It should be apparent that the printer terminal can be used with any Touch Tone TM telephone, whether in the same building or across the country. This makes the system very flexible because order entry terminals are commonly available.

FUNCTIONAL DESCRIPTION

Figure 2:
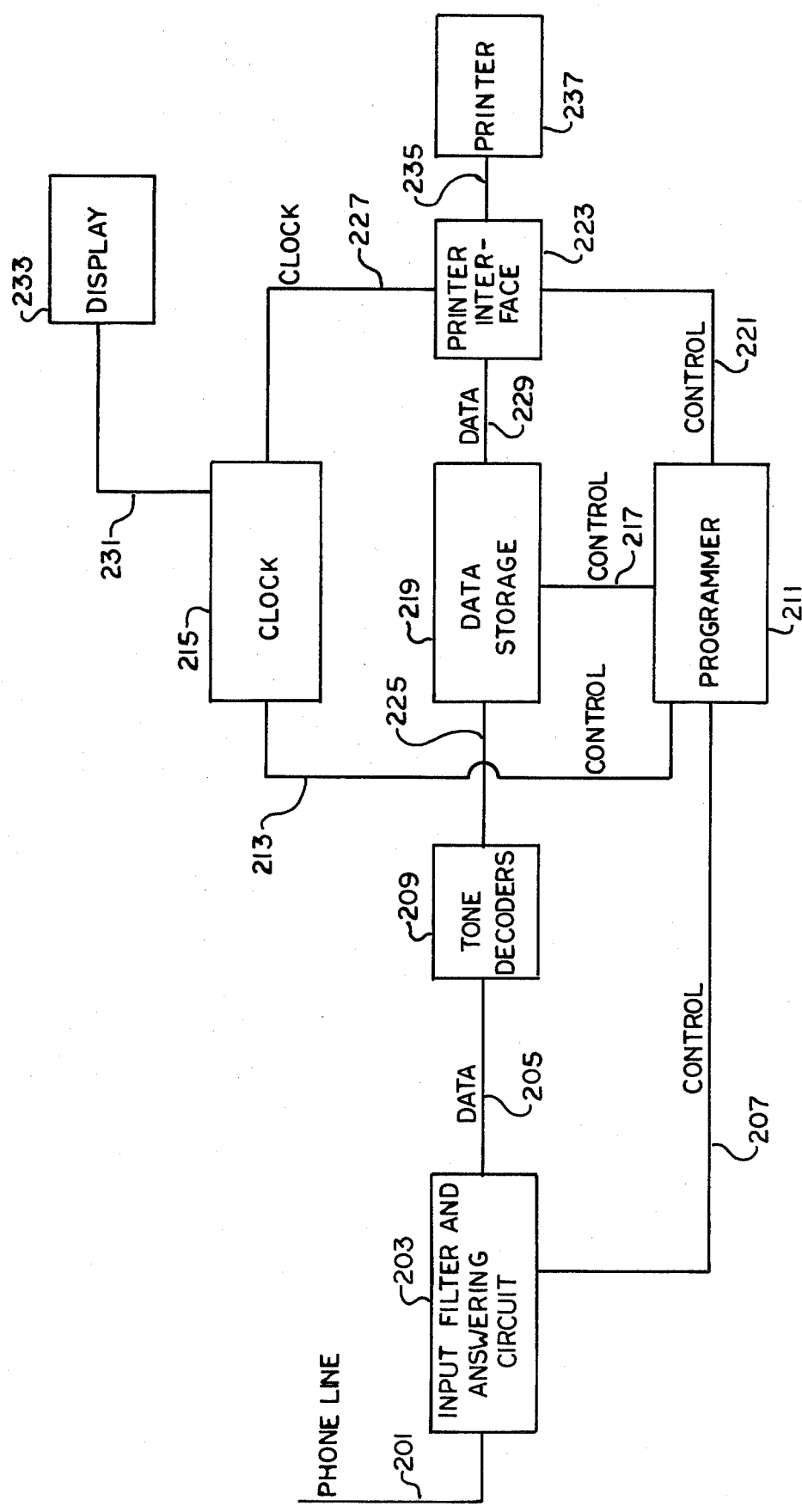
FIG. 2 is a schematic block diagram showing the relationship of the functional elements of a printer terminal constructed according to the preferred embodiment of the present invention.

FIG. 2 is a functional block diagram illustrating the major elements of printer terminal 113. Telephone signal 201 is attached to input filter and answering circuit 203. Input filter 203 outputs data signals via line 205 and control signals via line 207. The data signals from line 205 are input to tone decoders 209 while the control signal on line 207 is input to programmer 211. Programmer 211 is connected by line 213 to clock 215; by line 217 to data storage unit 219; and by line 221 to printer interface unit 223.

Tone decoder 209 is connected by data line 225 to data storage unit 219. Clock 215 is connected by line 227 to printer interface unit 223 by line 227. Data storage unit 219 is connected by data line 229 to printer interface unit 223. Clock unit 215 is also connected by line 231 to display unit 233. Printer interface 223 is connected by line 235 to printer 237.

Functionally, input signals from phone line 201 are sorted by input filter and answering circuit 223. Specifically, input filter and answering circuit 223 provides a control signal to programmer unit 211. This control signal is responsive to the status of information on phone line 201. A unique control signal is generated if the input filter and answering circuit detects an incoming call and a different control signal is generated if the answering circuit 203 detects a dial tone on phone line 201. These control signals allow programmer unit 211 to control the operation of the rest of printer terminal 113.

The input filters in input filter and answering circuit 203 divide the audio tones that comprise the data signals present on phone line 201 into high and low frequency groups. As will be explained in more detail later, these low and high frequency tone groups are fed as input to tone decoder unit 209, which fully decodes the data signals. The decoded data signals are inputted to data storage unit 219 and then fed, under the control of programmer 211 to printer interface unit 223 and thence to printer 237. The output of clock 215 is displayed by display unit 223. The clock's output is also fed under the control of programmer 211 to printer interface unit 223 and printed by printer 237.

Each of the functional blocks described in FIG. 2 is described in more detail below.

Power Supply—Printer Terminal

Figure 3:
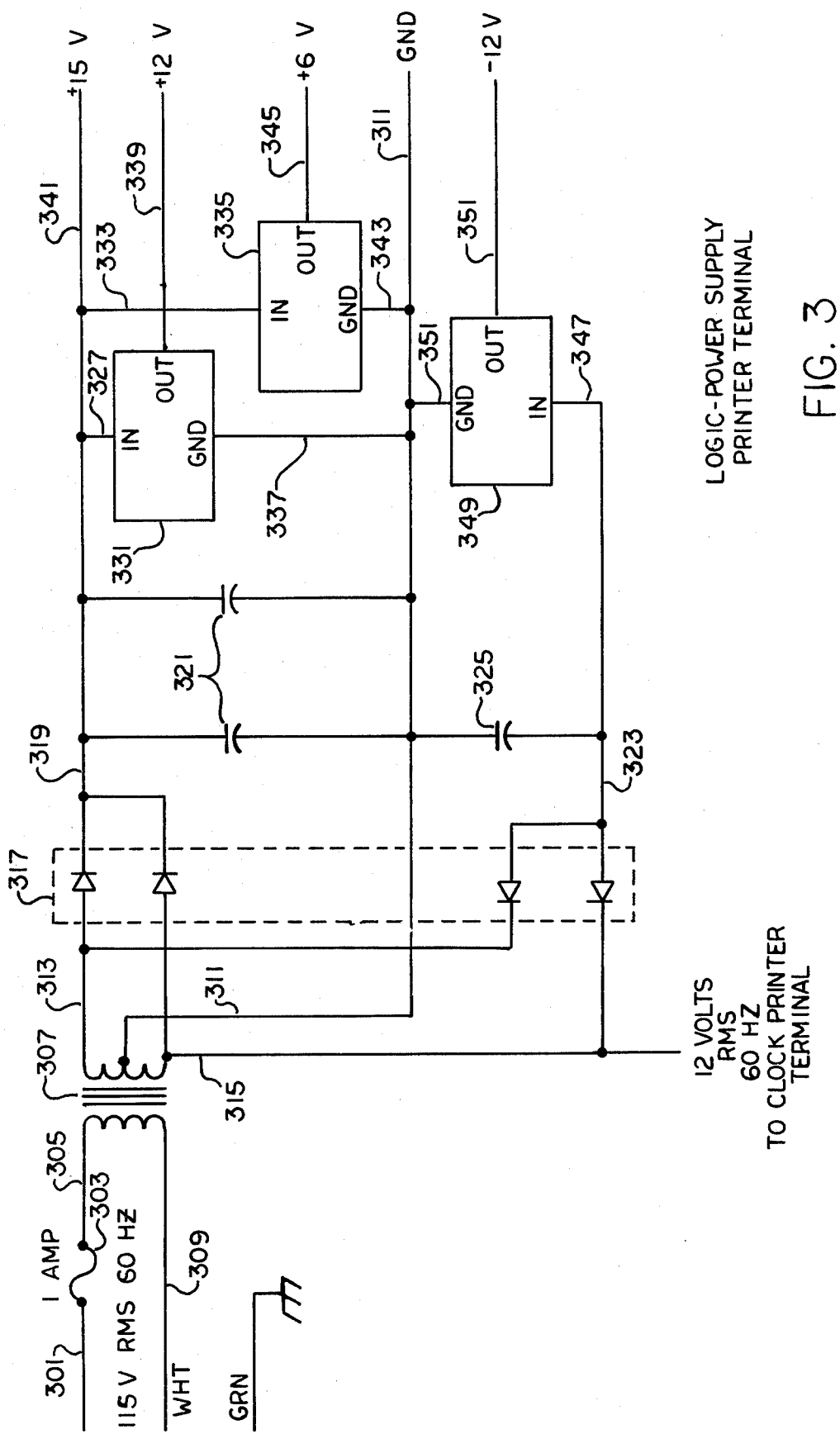
FIG. 3 is an electric schematic diagram of the power supply of a printer terminal constructed according to the preferred embodiment of the present invention.

FIG. 3 is an electrical schematic illustrating a power supply adequate to supply the required voltages to operate the embodiment of printer terminal 113 described in connection with FIGS. 4 through 13 below.

Line 301 is connected at one end to a source of 115 Volt 60 Hz electric power and at its other end to the power side of fuse 303. Line 305 is connected to fuse 303 and to one side of the primary windings of transformer 307. The other side of the primary windings of transformer 307 are connected by line 309 to a source of 115 V RMS 60 Hz power. Fuse 303 is a 1-amp fuse and transformer 307 is a 115 V 60 Hz to 30 V center-tap transformer which may be a signal 241-6-24. The center tap of transformer 307 is grounded through line 311. Positive leg 313 of transformer 307 and negative leg 315 of transformer 307 are connected to a bridge rectifier circuit 317. Bridge rectifier 317 comprises four 1N4002 rectifiers.

Positive bridge rectifier output 319 is connected to ground 311 by smoothing capacitors 321 which are 2000 MFD 16-volt electrolytic capacitors. Negative side 323 of bridge rectifier circuit 317 is connected to ground through smoothing capacitor 325, which is a 2000 MFD 16-volt electrolytic capacitor.

Positive output 319 is also connected to input 327 of voltage regulator 331 and to input 333 of voltage regulator 335. Voltage regulator 331 is preferably an LM340-12 whose ground connection is connected to ground 311 by line 337 and whose output through line 339 is regulated positive 12 V with respect to ground 311. Positive line 319 becomes output line 341 and is unregulated positive 15 V with respect to ground 311.

Voltage regulator 335 is preferably an LM340-6, which is connected to ground 311 via line 343 and produces a regulated 6 V positive output with respect to ground 311 through its output line 345.

Negative bridge output 323 is connected by line 347 to the input of voltage regulator 349. Voltage regulator 349 is preferably an LM320-12, which is connected to ground 311 via line 351 and produces an output of negative 12 V regulated with respect to ground 311 at its output line 351.

Functionally, 115 V 60 cycle AC power is applied at the primary winding of transformer 307 through fuse 303. The center tap secondary of transformer 307 is connected to bridge rectifier 317 and produces plus and minus 15 V of pulsating DC. This pulsating DC is smoothed by filter capacitors 321 and 325 and provides unregulated input power to voltage regulators 331, 335 and 349. These voltage regulators produce regulated plus 12 V, plus 6 V and minus 12 V with respect to ground 311 required by the preferred embodiment of the present invention. Bridge rectifier 317 directly produces the unregulated 15 V supply required by the preferred embodiment of the present invention.

Input Filter and Answer Control Circuitry

Figure 4:
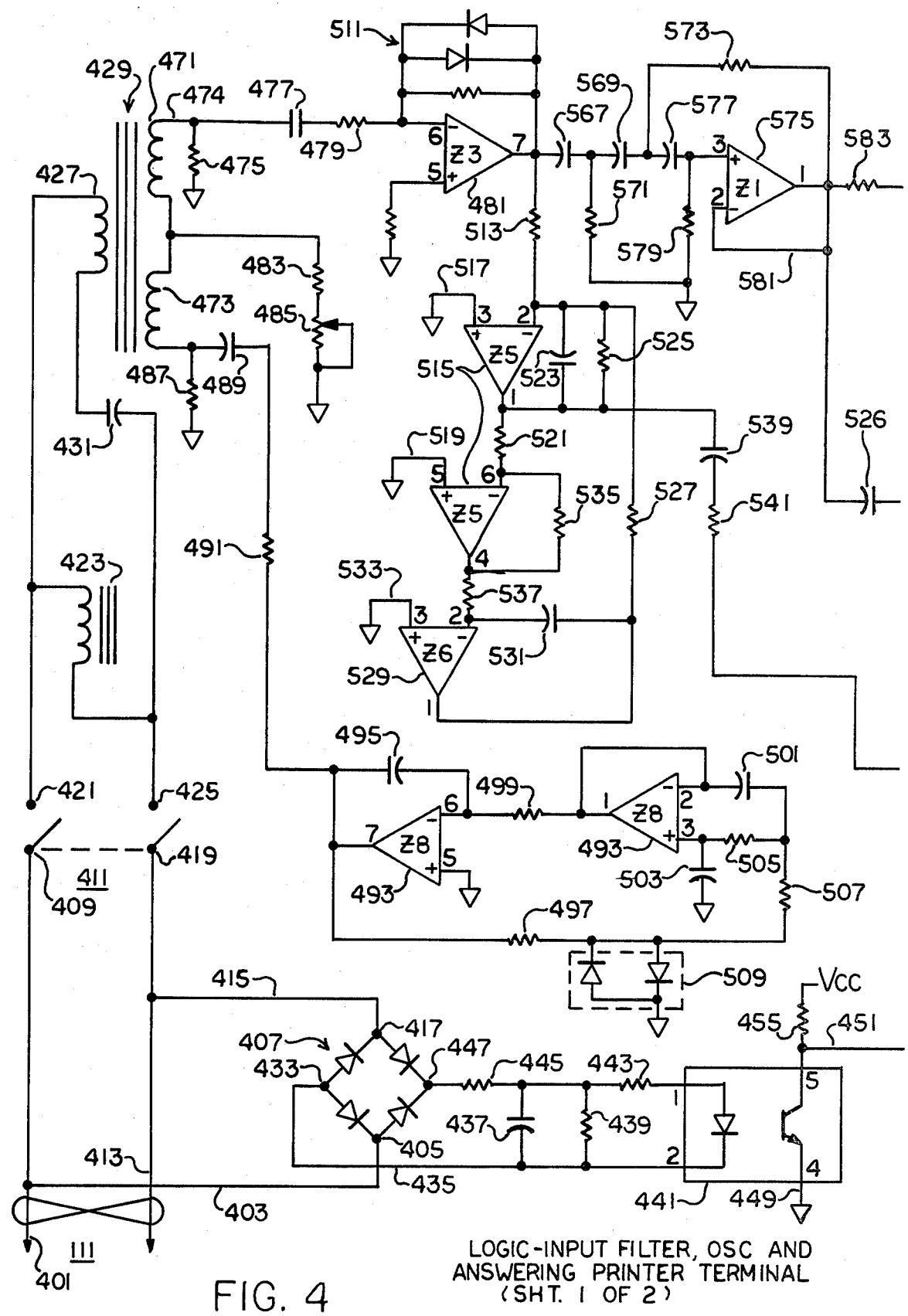
FIG. 4 is an electrical schematic diagram illustrating a first portion of the input filter and associated answering control circuitry of the printer terminal of the present invention.
Figure 5:
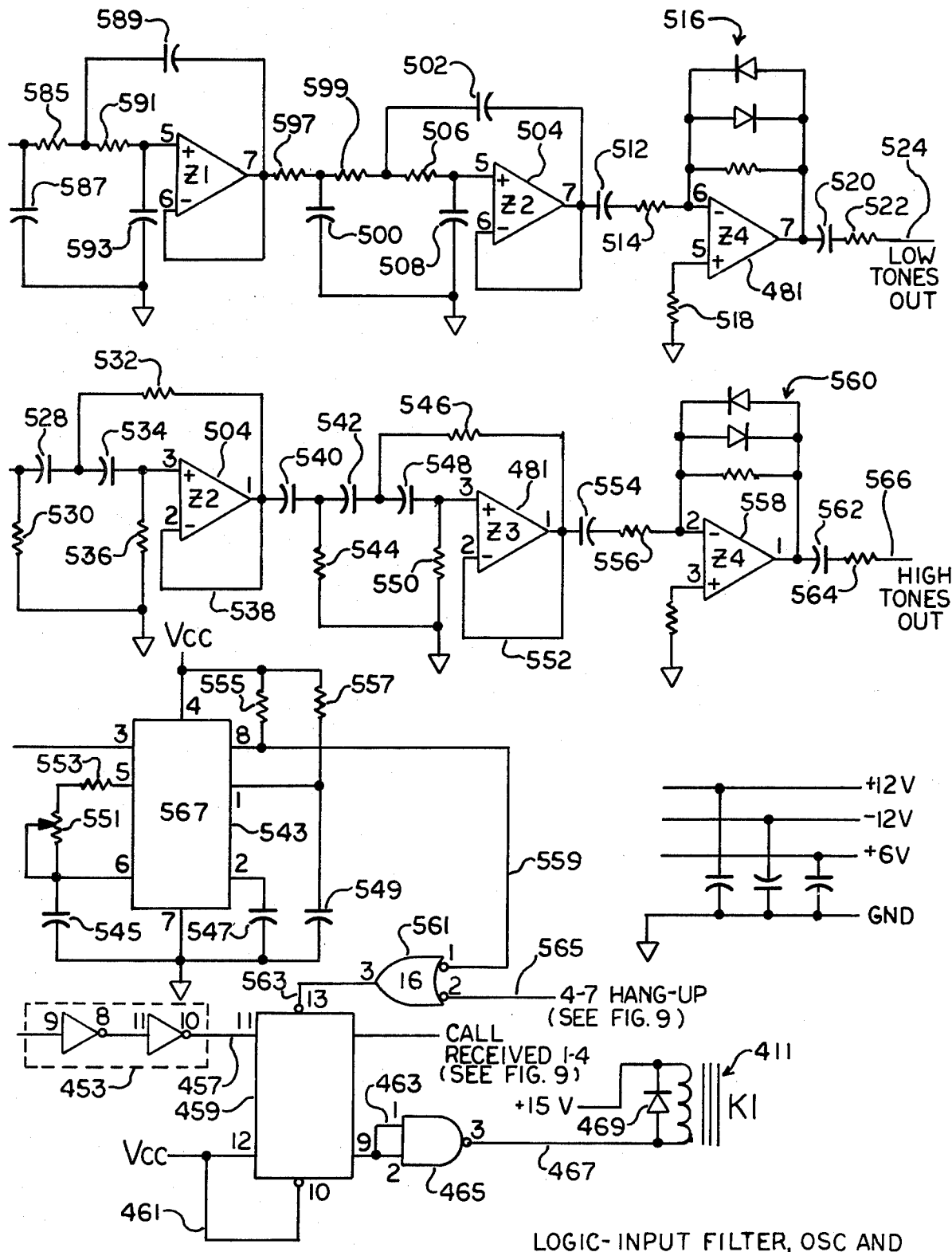
FIG. 5 is an electrical schematic diagram illustrating the second portion of the input filter and answering circuit of the printer terminal of the preferred embodiment of the present invention.

FIGS. 4 and 5 must be taken together as they comprise the input filter and answer control circuitry of the preferred embodiment of the present invention. To correctly read the electrical schematic displayed in these two figures, the left edge of FIG. 5 should be matched to the right edge of FIG. 4.

High side 401 of phone line 111 is attached directly by line 403 to terminal 405 of bridge rectifier assembly 407. High side 401 is also connected to upper relay armature 409 of relay 411. Low side 413 of phone line 111 is connected directly by line 415 to terminal 417 of bridge rectifier circuit 407 and to lower relay armature 419 of relay 411. Bridge rectifier assembly 407 comprises four 1N4002 diodes connected in a bridge circuit. Relay 411 is preferably a Potter & Brumfield R10-E1-Z4-V185. Upper relay armature 409 and lower relay armature 419 are mechanically coupled and operate as a double-pole single-throw normally open switch. Upper relay armature contact point 421 is connected to the coil windings of inductance 423, which is preferably a Microtran T4415. The other side of the coil winding of inductor 423 is connected to lower relay armature contact point 425. Relay armature contact point 421 is also connected to one side of the primary windings 427 of transformer 429, which is preferably a Microtran MT35. The other side of primary coil winding 427 is connected to one side of capacitor 431, which is preferably a 39 MFD 50 V 1% electrolytic capacitor. The other side of electrolytic capacitor 431 is connected to relay contact point 425. Terminal 433 of bridge assembly 407 is connected via line 435 to one side of capacitor 437, which is a 39 MFD 10% 50 V electrolytic capacitor, and to one side of resistor 439, which is preferably a 1% ¼-watt 20,000 ohm resistor. Line 435 is also connected to terminal 2 of optoisolator 441, which is preferably an MCA230 optoisolator. Terminal 1 of optoisolator 441 is connected through resistor 443, which is preferably a 1% ¼-watt 2,000 ohm resistor, to the other side of resistor 439 in capacitor 437. The other side of capacitor 437 is also connected through resistor 445, which is a 10,000 ohm 1% ¼-watt resistor, to terminal 447 of bridge circuit 407.

Terminal 4 of optoisolator 441 is connected through line 449 to ground by line 449. Terminal 5 of optoisolator 441 is connected directly by line 451 to terminal 9 of integrated circuit 453, which is preferably a 74C04, and indirectly through resistor 455, which is a 1% metal film ¼-watt 27,000 ohm resistance to Vcc. Terminal 8 of integrated circuit 453 is wired directly to terminal 11 and terminal 10 of this integrated circuit is connected via line 457 to terminal 11 of integrated circuit 459, which is preferably a 74C74. Terminal 10 of integrated circuit 459 is wired by connector 461 to terminal 12 of the integrated circuit and is connected to Vcc. Terminal 9 of integrated circuit 459 is connected via lines 463 to terminals 1 and 2 of integrated circuit 465, which is a D53632N. Terminal 3 of integrated circuit 465 is connected via line 467 to one side of the coil windings of relay 411. The other side of relay 411 is connected to plus 15 V from the power supply shown in FIG. 3. Diode 469 is connected in parallel across the coil windings of relay 411. Diode 469 is a 1N4002.

Transformer 429 has a first secondary winding 471 and a second secondary winding 473. One side of primary winding 471 is connected through line 473 and resistance 475, which is a 590 ohm 1% ¼-watt metal film resistor to ground and to one side of capacitor 477, which is a 0.1 MFD 10% 50 V capacitor. The other side of capacitor 477 is connected through resistance 479, which is a 10,000 ohm 1% metal film resistor to terminal 3 of integrated circuit 481, which is preferably an MC1558 dual operational amplifier. The other side of secondary 471 is connected to one side of secondary 473 and to one side of resistance 483, which is preferably a 249 ohm ¼-watt 1% metal film resistor. The other side of resistor 483 is connected through a potentiometer 485, which is a 100 ohm potentiometer to ground. The other side of secondary 473 is connected through resistor 487, which is preferably a 490 ohm 1% ¼-watt metal film resistor to ground and to one side of capacitor 489, which is preferably a 2.2 MFD 10% 50 V capacitor. The other side of capacitor 489 is connected through resistor 491, which is a 1,000 ohm 1% metal film ¼-watt resistor to terminal 7 of integrated circuit 493, which is preferably a MC1558 dual operational amplifier, and to one side of capacitor 495, which is preferably a 0.047 MFD 5% 50 V capacitor, and resistor 497, which is preferably a 2,000 ohm 1% ¼-watt metal film resistor. Terminal 5 of integrated circuit 493 is grounded. Terminal 6 of integrated circuit 493 is connected to the other side of capacitor 495 and to one side of resistor 499, which is a 10,000 ohm 1% ¼-watt metal film resistor. The other side of resistor 499 is connected to terminals 1 and 2 of integrated circuit 493 and to one side of capacitor 501, which is preferably a 0.1 MFD 5% 50 V capacitor. Terminal 3 of integrated circuit 493 is connected through capacitor 503, which is a 0.0475% 50 V capacitor to ground. Terminal 3 of integrated circuit 493 is also connected through resistor 505, which is a 10,000 ohm 1% ¼-watt metal film resistor to the other side of capacitor 501 and to one side of resistor 507, which is a 10,000 ohm 1% ¼-watt metal film resistor. The other side of resistor 507 and the other side of resistor 497 are connected together and, through diode network 509, which comprises two parallel reverse polarity 1N914 diodes, to ground.

Terminal 3 of integrated circuit 481 is connected through resistor diode network 511, which preferably comprises a 10,000 ohm 1% metal film resistor in parallel with two reversed polarity 1N914 diodes to terminal 1 of integrated circuit 481.

Terminal 1 of integrated circuit 481 is also connected through resistance 513 to terminal 2 of integrated circuit 515, which is preferably an MC1558 dual operational amplifier. Terminals 3 and 5 of integrated circuit 515 are grounded through lines 517 and 519, respectively. Terminal 1 of integrated circuit 515 is connected through resistance 521 which is preferably a 10,000 ohm 1% ¼-watt metal film resistor.

Capacitor 523, which is a 0.01 MFD 50 V 1% capacitor is connected between terminals 2 and 1 of integrated circuit 515. Resistor 525, which is a 1.17 megohm 1% ¼-watt metal film resistor is also connected between terminals 1 and 2 of integrated circuit 515. Terminal 2 of integrated circuit 515 is connected to one side of resistor 527, which is a 46,800 ohm 1% metal film ¼-watt resistor. The other side of resistor 527 is connected directly to terminal 1 of integrated circuit 529, which is preferably an MC1558 dual operational amplifier, and through capacitor 531, which is a 0.01 1% 50 V capacitor to terminal 2 of integrated circuit 529. Terminal 3 of integrated circuit 529 is grounded through line 533.

Terminal 6 of integrated circuit 515 is connected through resistor 535, which is preferably a 10,000 ohm 1% ¼-watt metal film resistor, to terminal 4 of integrated circuit 515. Terminal 4 of integrated circuit 515 is connected through resistor 537, which is a 6,800 ohm 1% ¼-watt metal film resistor, to terminal 2 of integrated circuit 529.

Terminal 1 of integrated circuit 515 is also connected directly to one side of capacitor 539, which is a 0.1 MFD 1% 50 V capacitor. The other side of capacitor 539 is connected through resistor 541, which is a 1,000 ohm 1% ¼-watt metal film resistor, to terminal 3 of integrated circuit 543. Integrated circuit 543 is preferably a 567 tone decoder. Terminal 7 of integrated circuit 543 is connected to ground. Terminal 6 of integrated circuit 543 is connected through capacitor 545, which is preferably a 0.1 MFD 10% 50 V capacitor, to ground. Terminal 2 of integrated circuit 543 is connected through capacitor 547, which is preferably a 2.2 MFD 10% 50 V electrolytic capacitor, to ground. Terminal 1 of integrated circuit 543 is connected through capacitor 549, which is preferably a 39 MFD 10% 50 V electrolytic capacitor, to ground. Terminal 6 of integrated circuit 543 is also connected to one side of potentiometer 551, which is a 10,000 ohm potentiometer. The other side of potentiometer 551 is connected through resistor 553, which is preferably a 10,000 ohm 1% ¼-watt metal film resistor to terminal 5 of integrated circuit 543. Terminal 4 of integrated circuit 543 is connected directly to Vcc and to one side of resistor 555, which is preferably a 2,000 ohm 1% ¼-watt metal film resistor, and resistor 557, which is preferably a 10,000 ohm ¼-watt 1% metal film resistor. The other side of resistor 557 is connected to terminal 1 of integrated circuit 543. The other side of resistor 555 is connected to terminal 8 of integrated circuit 543. Terminal 8 of integrated circuit 567 is also connected via line 559 to terminal 1 of integrated circuit 561, which is preferably a 74C08. The output of Or Gate 561 is connected by line 563 to terminal 13 of integrated circuit 459. Terminal 2 of integrated circuit 561 is connected by line 565 to terminal 7 of integrated circuit 821 in FIG. 9, which describes the programmer for the printer terminal of the present invention.

Terminal 1 of integrated circuit 481 is connected to one side of capacitor 567, which is a 0.018 MFD 1% 50 V capacitor. The other side of capacitor 567 is connected to one side of capacitor 569, which is also a 0.018 MFD 1% 50 V capacitor, and through resistor 571, which is a 7.87 ohm 1% ¼-watt metal film resistor, to ground. The other side of capacitor 569 is connected through resistor 573, which is a 1,780 ohm 1% ¼-watt metal film resistor, to terminal 1 of integrated circuit 575, which is preferably a MC1558 dual operational amplifier; and through capacitor 577, which is preferably a 0.018 MFD 50 V 1% capacitor, to terminal 3 of integrated circuit 575 and through resistor 579, which is preferably a 154,000 ohm ¼-watt 1% metal film resistor, to ground. Terminal 2 of integrated circuit 575 is directly strapped by conductor 581 to terminal 1 of integrated circuit 575.

Terminal 1 of integrated circuit 575 is connected through resistor 583, which is an 8.48 ohm 1% ¼-watt metal film resistor, to one side of resistor 585, which is also a 3.48 ohm 1% ¼-watt metal film resistor, and to one side of capacitor 587, which is preferably a 0.1 MFD 1% 50 V capacitor. The other side of capacitor 587 is connected to ground. The other side of resistor 585 is connected through capacitor 589, which is preferably a 0.443 MFD 1% 50 V capacitor, to terminal 7 of integrated circuit 575, and through resistor 591, which is preferably also a 3.48 ohm 1% ¼-watt metal film resistor, to terminal 5 of integrated circuit 575. Terminal 5 of integrated circuit 575 is connected through capacitor 593, which is a 0.005 MFD 1% 50 V capacitor, to ground. Terminal 6 of integrated circuit 575 is strapped by conductor 595 to terminal 7 of integrated circuit 575.

Terminal 7 of integrated circuit 575 is connected through resistor 597, which is preferably a 3.48 ohm ¼-watt 1% metal film resistor, to one side of resistor 599, which is also a 3.48 ohm 1% ¼-watt metal film resistor, and through capacitor 500, which is preferably a 0.1 MFD 1% 50 V capacitor, to ground. The other side of resistor 599 is connected through capacitor 502, which is preferably a 0.443 MFD 1% 50 V capacitor, to terminal 7 of integrated circuit 504, which is preferably an MC1558 dual operational amplifier; and through resistor 506, which is preferably a 3.48 ohm 1% ¼-watt metal film resistor, to terminal 5 of integrated circuit 504. Terminal 5 of integrated circuit 504 is connected through capacitor 508, which is preferably 0.005 MFD 1% 50 V capacitor, to ground. Terminal 6 of integrated circuit 504 is strapped by conductor 510 to terminal 7 of integrated circuit 504.

Terminal 7 of integrated circuit 504 is connected through capacitor 512, which is preferably a 0.1 MFD 10% 50 V capacitor, to one side of resistor 514, which is preferably a 5,110 ohm 1% ¼-watt metal film resistor. The other side of resistor 514 is connected directly to terminal 6 of integrated circuit 481 and through diode resistor network 516, which is preferably a 100,000 ohm 1% ¼-watt metal film resistor, in parallel with two opposing polarity 1N914 diodes, to terminal 7 of integrated circuit 481. Terminal 5 of integrated circuit 481 is connected through resistor 518, which is preferably a 100,000 ohm 1% ¼-watt metal film resistor, to ground. Terminal 7 of integrated circuit 481 is connected through capacitor 520, which is preferably a 2.2 MFD 10% 50 V capacitor, to one side of resistor 522, which is preferably a 1,000 ohm 1% ¼-watt metal film resistor. The other side of resistor 522 is connected to low tones output line 524, which is also low tones input line 524 on FIG. 6.

Terminal 1 of integrated circuit 575 is connected through capacitor 526, which is preferably a 0.01 MFD 1% 50 V capacitor, to one side of capacitor 528, which is also preferably a 0.01 MFD 1% 50 V capacitor, and through resistor 530, which is preferably a 6,490 ohm 1% ¼-watt metal film resistor, to ground. The other side of capacitor 528 is connected through resistor 532, which is preferably a 1,470 ohm 1% ¼-watt resistor, to terminal 1 of integrated circuit 504; and through capacitor 534, which is preferably a 0.01 MFD 1% 50 V capacitor, to terminal 3 of integrated circuit 504. Terminal 3 of integrated circuit 504 is connected through resistor 536, which is preferably a 127,000 ohm 1% ¼-watt metal film resistor, to ground. Terminal 2 of integrated circuit 504 is strapped by conductor 538 to terminal 1 of integrated circuit 504.

Terminal 1 of integrated circuit 504 is connected through capacitor 540, which is preferably a 0.01 MFD 1% 50 V capacitor, to one side of capacitor 542, which is also a 0.01 MFD 1% 50 V capacitor, and through resistor 544, which is preferably a 6,490 ohm 1% ¼-watt metal film resistor, to ground. The other side of capacitor 542 is connected through resistor 546, which is preferably a 1,470 ohm 1% ¼-watt metal film resistor, to terminal 1 of integrated circuit 481; and through capacitor 448, which is a 0.01 MFD 1% 50 V capacitor, to terminal 3 of integrated circuit 481. Terminal 3 of integrated circuit 481 is also connected through resistor 550, which is preferably a 127,000 ohm 1% ¼-watt metal film resistor, to ground. Terminal 2 of integrated circuit 481 is strapped by conductor 552 to terminal 1 of integrated circuit 481. Terminal 1 of integrated circuit 481 is connected through capacitor 554, which is a 0.1 MFD 10% 50 V capacitor, to one side of resistor 556, which is preferably a 5,110 ohm 1% ¼-watt metal film resistor. The other side of resistor 556 is connected directly to terminal 2 of integrated circuit 558, which is preferably an MC1558 dual operational amplifier, and through resistor diode network 560, which comprises 100,000 ohm 1% ¼-watt metal film resistor in parallel with two reversed polarized 1N914 diodes, to terminal 1 of integrated circuit 558. Terminal 1 of integrated circuit 558 is connected through capacitor 562, which is preferably a 2.2 MFD 10% 50 V capacitor, to one side of resistor 564, which is preferably a 1,000 ohm 1% ¼-watt metal film resistor. The other side of resistor 564 is connected to high tones output line 566, which is the same as high tones input line 566 in FIG. 6.

Input Filter, Ready Oscillator, and Answering Circuit

The following is a functional description of the structure described above.

Telephone Answering Circuit

The answering circuit comprises bridge rectifier 407; the RC filter network made up of resistor 445, capacitor 437, resistor 439 and resistor 443; optical isolator 441; flip-flop 459 and relay 411.

Bridge rectifier 407 is AC coupled to phone lines 401 and 413. When 20 Hz ringing voltage is applied to the phone line, capacitor 437 is charged. The charge in capacitor 437 turns on the light emitting diode in optoisolator 441. The phototransistor in optical coupler 441 responds to the light from the diode grounding resistor 455 and flip-flop 459 to terminal 11. When the ring voltage stops, the capacitor discharges through resistor 439 and the optoisolator turns off. Resistor 455 is then isolated from ground and terminal 11 of flip-flop 459 goes back to Vcc. This provides a positive transition to flip-flop 459's input. This transition sets the flip-flop output high. This causes terminal 8, which is the $\overline{Q}$ output, to go low and indicates a call has been received. A signal is then output to the programmer, which is described in detail in FIG. 9. Terminal 9 of flip-flop 459 goes high, to the "1" state, and activates relay 411, which connects phone lines 401 and 413 through double pole relay armatures 409 and 419 to relay contact points 421 and 425, respectively. Closing these relay contacts connects the pole line to holding coil 423 and input windings 427 of transformer 429.

Now that the phone line is connected to the printer terminal, it must be reset or disconnected in some manner. The present invention can accomplish this function in two different ways. First, the programmer described in connection with FIG. 9 below can logically determine that a transmission has been concluded. If this happens, the programmer transmits a logic "1", or high data signal, through line 565 to Or Gate integrated circuit 561, which resets flip-flop 459 by causing line 563 to go high and thus inputs a logic "1" to terminal 13 of flip-flop 459. The other method of resetting the present invention is for the answering circuit to detect a dial tone through hybrid transformer 429. In this second case, the active filter comprising operational amplifiers 515 and 529 and their associated RC networks drive tone decoder integrated circuit 543 which decodes the 340 Hz dial tone. If the source station is hung up without a command to reset the printer terminal, the central station switching equipment of the telephone company will return a dial tone to the printer terminal after about 15 seconds. This is a "calling party disconnect". This action automatically resets the answering circuit by causing integrated circuit 543 to output a logic "1", or high signal, through line 559 to terminal 1 of Or Gate integrated circuit 561, upon the detection of a 340 Hz dial tone. This logic "1" at terminal 1 of integrated circuit 561 causes line 563 to go high, which inputs a logic "1" at terminal 13 of integrated circuit flip-flop 459, which resets the flip-flop.

Ready Oscillator

Integrated circuit 493 comprises two operational amplifiers which make up a 200 Hz oscillator. The output of this oscillator is applied to the hybrid secondary winding 473 of hybrid transformer 429 and thus to the phone line. When a source terminal is used, as will be described later, this 200 Hz tone tells the source terminal that the printer terminal is ready to receive data.

Input Filter

The Touch Tone ™ dialing system developed by the Bell Telephone Company codes all numeric and symbolic keys with a two-tone system. These two-tones comprise one tone from a low frequency group and one tone from a high frequency group. Both tones must be present to define a specific key. The present invention requires an input filter to remove the 200 Hz ready tone and to separate the group of high tones from the group of low tones before these tones can be applied to the tone coder circuitry described in FIG. 6, below. This removal and separation is accomplished in the present invention as follows: integrated circuit 481, terminal 7, is a buffer amplifier that drives the dial tone filter in the input filter circuit. Integrated circuit 575, terminal 1, is a high pass filter that removes the 200 Hz ready signal. Integrated circuit 575, terminal 7, and 504, terminal 7, and their associated RC networks, are active low pass filters that remove the tones in the high frequency group so that only the tones in the low frequency group remain. These low frequency signals are applied to integrated circuit 458, terminal 7, which acts as a voltage limiter to control the amplitude of the low frequency tones that are input to the decoder circuitry described below in connection with FIG. 6. Amplifiers 504, terminal 1, and 575 terminal 1, and their associated RC networks, form active high pass filters that remove low frequency tones and allow only the tones from the high frequency group to pass. These high frequency tones are applied to integrated circuit 458, which acts as a voltage limiter to drive high frequency input 556 of the tone decoders described below in connection with FIG. 6.

Tone Decoder

Figure 6:
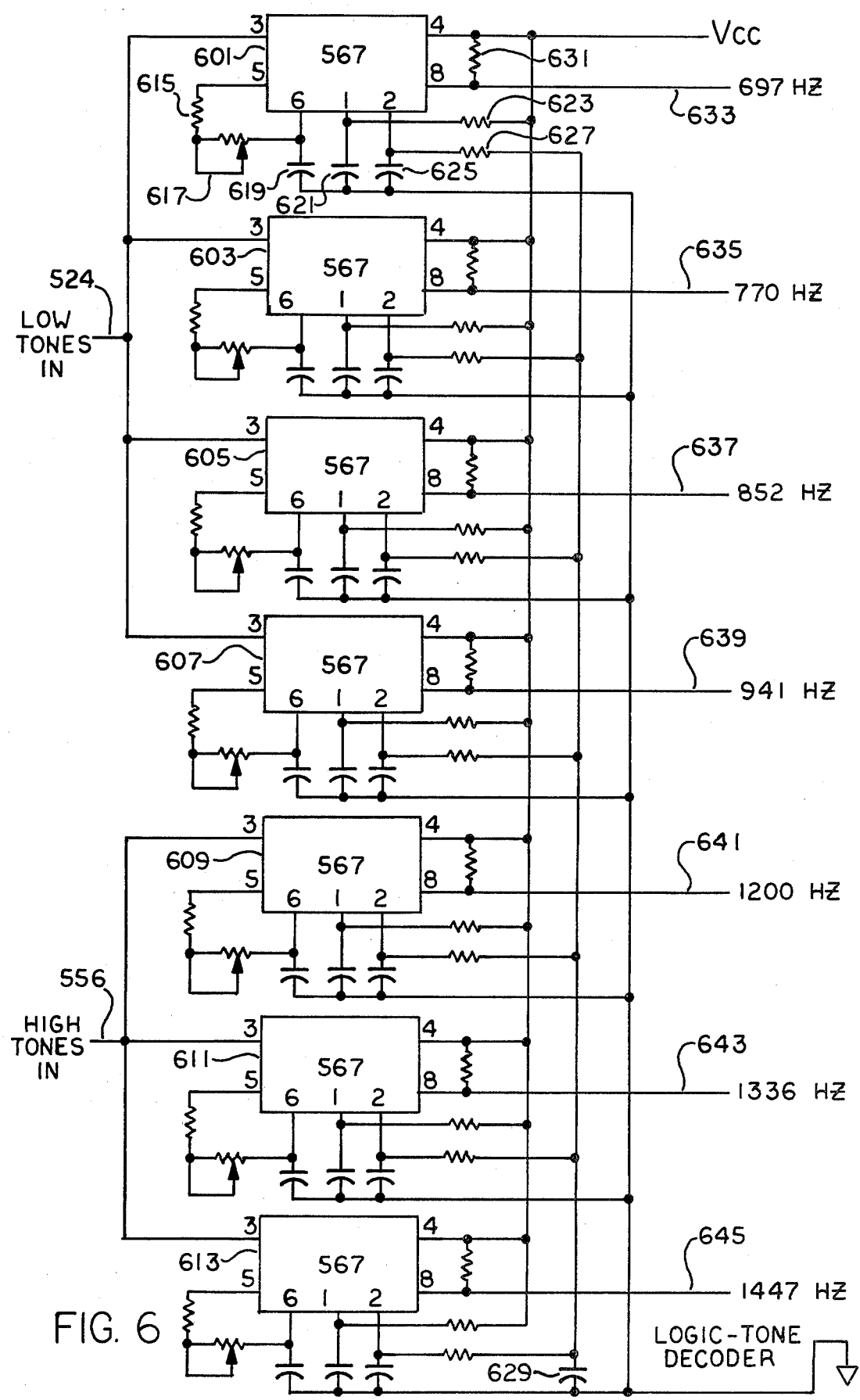
FIG. 6 is an electrical schematic diagram illustrating the tone decoder circuitry of the printer terminal of the preferred embodiment of the present invention.

FIG. 6 is an electrical schematic illustrating the tone decoder circuitry of the printer terminal of the present invention.

The tone decoder comprises seven 567 tone decoders. Tone decoder 601 goes low when a 697 Hz tone is detected; tone decoder 603 goes low when a 770 Hz tone is detected; tone decoder 605 goes low when a 852 Hz tone is detected; tone decoder 607 goes low when a 941 Hz tone is detected; tone decoder 609 goes low when a 1200 Hz tone is detected; tone detector 611 goes low when a 1336 Hz tone is detected; and tone detector 613 goes low when a 1447 Hz tone is detected.

To "go low" means the logic output signal at pin 8 of the integrated circuit of the tone detector goes to a logic "0". Low tone input line 524 is connected to terminal 3 of tone decoders 601, 603, 605 and 607. High tone input line 556 is connected to terminal 3 of tone decoders 607, 611 and 613.

The resistor and capacitor networks associated with each one of tone decoders 601–613 is identical, therefore only the circuitry associated with tone decoder 601 will be described in detail.

Vcc is connected directly to terminal 4 of each of the tone decoders. Terminal 5 of tone decoder 601 is connected through resistor 615, which is preferably a 6,650 ohm 1% ¼-watt metal film resistor, to one side of potentiometer 617, which is a 10,000 ohm potentiometer. The other side of potentiometer 617 is connected directly to terminal 6 of integrated circuit 601 and through capacitor 619, which is preferably a 0.1 MFD 10% 50 V capacitor, to ground. Terminal 1 of integrated circuit 601 is connected through capacitor 621, which is preferably a 2.2 MFD 10% 50 V capacitor, to ground. Terminal 1 is also connected through resistor 623, which is preferably a 10,000 ohm ¼-watt 1% metal film resistor, to Vcc. Terminal 2 of integrated circuit 601 is connected through capacitor 625, which is preferably a 1 MFD 10% 50 V capacitor, to ground. Terminal 2 of integrated circuit 601 is also connected through resistor 627, which is preferably a 4,700 ohm 1% ¼-watt metal film resistor, to one side of capacitor 629, which is preferably a 39 MFD 1% 50 V capacitor. The other side of capacitor 629 is connected to ground. Terminal 8 of integrated circuit 601 is connected through resistor 631, which is preferably a 6,800 ohm 1% ¼-watt metal film resistor, to terminal 4 of integrated circuit 601.

It should be understood that the circuit connections, resistors and capacitors for each of the tone decoders 601–613 are identical. The set point frequency of the each individual tone decoders is determined by the setting of the potentiometer analogous to potentiometer 617 on decoder 601.

Each tone decoder has a unique output line. Integrated circuit 601 has output line 633 connected to terminal 8. Likewise, integrated circuit 603 has output line 635 connected to its terminal 8; integrated circuit 605 has output line 637 attached to its terminal 8; integrated circuit 607 has output line 639 attached to its terminal 8; integrated circuit 609 has output line 641 attached to its terminal 8; integrated circuit 611 has output line 643 attached to its terminal 8; and integrated circuit 613 has output line 645 attached to its terminal 8. Each of these output lines is associated with a specific frequency as shown in FIG. 6. Output lines 133-145 of FIG. 6 are the same as the input lines 633-645 of FIG. 7.

The tone decoder circuit is made up of seven signetics type NE567 tone decoder circuits. These tone decoders are phase-locked loop circuits that are attuned to the required frequencies by the RC network described above. Potentiometer 617 is adjusted to tune the circuit to the exact frequency. The output of the decoder circuit, at 10-8 of each integrated circuit 601-613, goes low when the tone that it is tuned for is received.

Data Storage Unit

Figure 7:
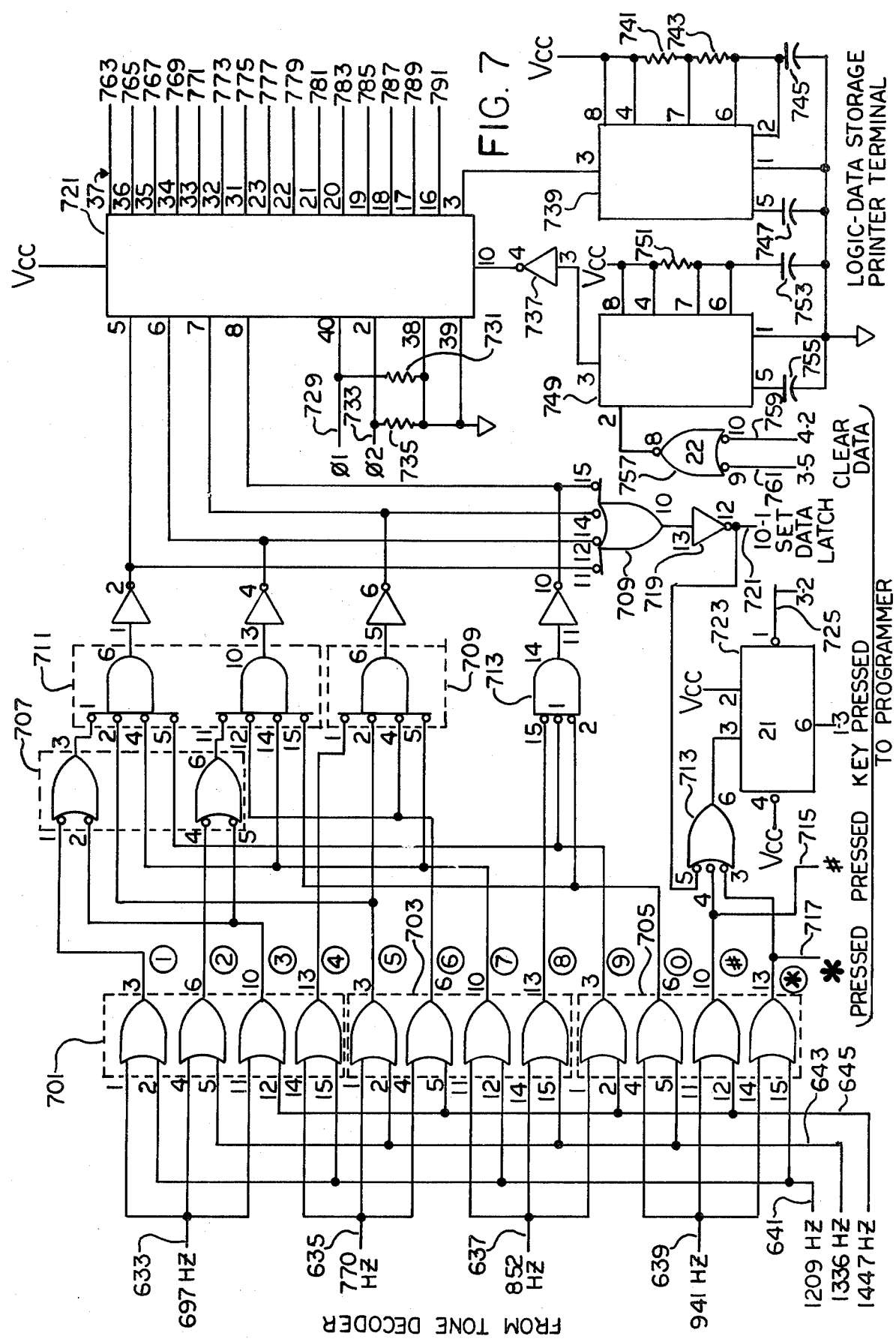
FIG. 7 is an electrical schematic detailing the data storage subassembly of a printer terminal constructed according to the preferred embodiment of the present invention.

FIG. 7 is an electrical schematic that illustrates the data storage portion of a printer terminal constructed according to the present invention.

The 697 Hz input line 633 is attached to terminals 1, 4 and 11 of integrated circuit 701, which is a 74C32 Quad Or Gate. 770 Hz input line 635 is connected to terminal 14 of integrated circuit 701 and terminals 1 and 4 of integrated circuit 703, which is also a 74C32 Quad Or Gate. 852 Hz input line 637 is connected to terminals 11 and 14 of integrated circuit 703 and to terminal 1 of integrated circuit 705, which is also a 74C32 Quad Or Gate. 941 Hz input line 639 is connected to terminals 4, 11 and 14 of integrated circuit 705. 1200 Hz input line 641 is connected to pin 15 of integrated circuit 705, terminal 12 of integrated circuit 703 and terminals 15 and 2 of integrated circuit 701. 1336 Hz input line 643 is connected to pin 5 of integrated circuit 705, to terminals 15 and 2 of integrated circuit 703, and to terminal 5 of integrated circuit 701. 1447 Hz input line 645 is connected to terminals 12 and 2 of integrated circuit 705, to terminal 5 of integrated circuit 703, and to terminal 12 of integrated circuit 701.

Terminal 3 of integrated circuit 701 is connected to terminal 1 of integrated circuit 707, which is a 74C08 dual Or Gate. Terminal 6 of integrated circuit 701 is connected to terminal 4 of integrated circuit 707. Terminal 10 of integrated circuit 701 is connected to terminals 2 and 5 of integrated circuit 707. Terminal 13 of integrated circuit 701 is connected to terminal 1 of integrated circuit 709, which is a 74C20. Terminal 3 of integrated circuit 703 is connected to terminal 2 of integrated circuit 709 and to terminal 2 of integrated circuit 711, which is also a 74C20. Terminal 6 of integrated circuit 703 is connected to terminal 4 of integrated circuit 709 and terminal 12 of integrated circuit 711. Terminal 10 of integrated circuit 703 is connected to terminal 5 of integrated circuit 709 and to terminals 14 and 4 of integrated circuit 711. Terminal 13 of integrated circuit 703 is connected to terminal 15 of integrated circuit 713, which is a 74C10. Terminal 3 of integrated circuit 705 is connected to terminal 1 of integrated circuit 713 and to terminal 5 of integrated circuit 711. Terminal 6 of integrated circuit 705 is connected to terminal 2 of integrated circuit 713 and to terminal 15 of integrated circuit 711. Terminal 10 of integrated circuit 705 is connected to terminal 4 of integrated circuit 713 and to output line 715, which is the same as the corresponding input line in FIG. 2, which illustrates the programmer. Terminal 13 of integrated circuit 705 is connected to terminal 3 of integrated circuit 713 and to output line 717, which is input line 717 in FIG. 9.

Terminal 3 of integrated circuit 707 is connected to pin 1 of integrated circuit 711. Pin 6 of integrated circuit 707 is connected to pin 11 of integrated circuit 707. Terminal 6 of integrated circuit 711 is connected to terminal 1 of integrated circuit 719. Integrated circuit 719 is preferably a 74CO4 Hex inverter. Terminal 10 of integrated circuit 711 is connected to terminal 3 of integrated circuit 719. Terminal 6 of integrated circuit 711 is connected to terminal 5 of integrated circuit 719 and terminal 14 of integrated circuit 713 is connected to terminal 11 of integrated circuit 719. Pin 2 of integrated circuit 719 is connected to pin 5 of calculator chip 721 and to terminal 11 of integrated circuit 709. Terminal 4 of integrated circuit 719 is connected to terminal 6 of calculator chip 721 and to terminal 12 of integrated circuit 709. Terminal 6 of integrated circuit 719 is connected to pin 7 of calculator integrated circuit 721, which is preferably a CT5001, and to terminal 14 of integrated circuit 709. Terminal 10 of integrated circuit 719 is connected to terminal 8 of calculator 721 and to terminal 15 of integrated circuit 709.

Terminal 10 of integrated circuit 709 is connected to terminal 13 of integrated circuit 719. Terminal 12 of integrated circuit 719 is connected to terminal 5 of integrated circuit 713 and to set data latch output line 721, which is the same as input line 721 in FIG. 9, discussed below. Terminal 6 of integrated circuit 713 is connected to terminal 3 of integrated circuit 723, which is a 74C74 flip-flop. Terminals 2 and 4 of integrated circuit 724 are connected to Vcc. Terminal 1 of integrated circuit 723 is connected to reset line 725, which is the same as reset line 725 in FIG. 9, discussed below. Terminal 6 of integrated circuit 723 is connected to key pressed output line 727, which is the same as line 727 in FIG. 9, discussed below.

Terminal 6 of calculator circuit 721 is connected to Vcc. Terminal 40 is connected to output clock line 729 and through resistor 731, which is a 10,000 ohm ¼-watt 1% metal film resistor, to terminal 38 of integrated circuit 721. Terminal 2 of integrated circuit 721 is connected directly to second clock output line 733 and through resistor 735, which is a 10,000 ohm 1% ¼-watt metal film resistor, to terminal 38 of integrated circuit 721. Terminals 38 and 39 of integrated circuit 721 are connected to ground. Terminal 10 of integrated circuit 721 is connected to terminal 4 of integrated circuit 737, which is a 74C04. Terminal 3 of integrated circuit 721 is connected to terminal 3 of integrated circuit 739, which is a 555 timer. Terminals 8 and 4 of integrated circuit 739 are connected to Vcc. Terminal 4 is connected through resistor 741, which is a 309 ohm 1% ¼-watt metal film resistor, to terminal 7 of integrated circuit 739. Terminal 7 of integrated circuit 739 is attached through resistor 743, which is a 2,000 ohm 1% ¼-watt metal film resistor, to terminal 6 of integrated circuit 739. Terminals 6 and 2 of integrated circuit 739 are connected through capacitor 745, which is a 0.047 MFD 10% 50 V capacitor, to ground. Terminal 1 of integrated circuit 739 is connected to ground. Terminal 5 of integrated circuit 739 is connected through capacitor 747, which is a 0.01 MFD 1% 50 V capacitor, to ground.

Terminal 3 of integrated circuit 737 is connected to terminal 3 of integrated circuit 749, which is a 555 timer. Terminals 8 and 4 of integrated circuit 749 are connected to Vcc. Terminal 4 of integrated circuit 749 is connected through resistor 751, which is a 30,000 ohm 1% ¼-watt metal film resistor, to terminal 7 of integrated circuit 749. Terminals 7 and 6 of integrated circuit 749 are connected through capacitor 753, which is a 2.2 MFD 10% 20 V electrolytic capacitor, to ground. Terminal 1 of integrated circuit 749 is connected directly to ground. Terminal 5 of integrated circuit 749 is connected through capacitor 755, which is a 0.01 MFD 1% 50 V capacitor, to ground. Terminal 2 of integrated circuit 749 is connected to terminal 8 of integrated circuit 757, which is a 74C08.

Terminal 10 of integrated circuit 757 is connected to clear data output line 759, which corresponds to line 759 in FIG. 9, discussed below. Terminal 9 of integrated circuit 757 is connected to clear data output line 761, which corresponds to line 761 in FIG. 9, discussed below. Terminals 37-31 inclusive, and 23-16, inclusive, of integrated circuit 721 correspond to output lines 763-791, respectively. Output lines 763-775, inclusive, correspond to similarly numbered input lines in FIG. 12, discussed below in connection with a printer interface unit. Output lines 777-791, inclusive, correspond to similarly numbered input lines in FIG. 13, also discussed below in connection with the printer interface unit.

FUNCTIONAL DESCRIPTION OF DATA STORAGE UNIT

Functionally, the data storage unit comprises an encoder circuit and a calculator chip that is used to store data for each line to be printed by the calculator. Only the data entry function of calculator chip 421 is used.

The encoder circuit is made up of integrated circuits 701, 703, 705, 707, 711, and 709. These act to encode the output from the tone decoder to binary coded decimel format, which is then input to the calculator chip. The "#" and "*" are decoded separately. When any numeric key is pressed, terminal 12 of integrated circuit 719 goes low, i.e., goes to logic "0". Flip-flop 723 is set when any key is pressed.

Calculator chip 721 stores the numeric data. The output of the calculator chip is multiplexed by digit and is presented in a format capable of operating a 7-segment display. Output lines 763-775, inclusive, define which segments of a given display are to be turned on and output lines 777-791, inclusive, define which digit is being displayed.

Integrated circuit 739 is an NE555 timer connected to run as a free-running multivibrator. This circuit provides a clock to the calculator chip. Integrated circuit 749 is also a NE555 timer connected as a one shot pulse generator to provide a pulse of the required length to clear the calculator chip.

Programmer

Figure 8:
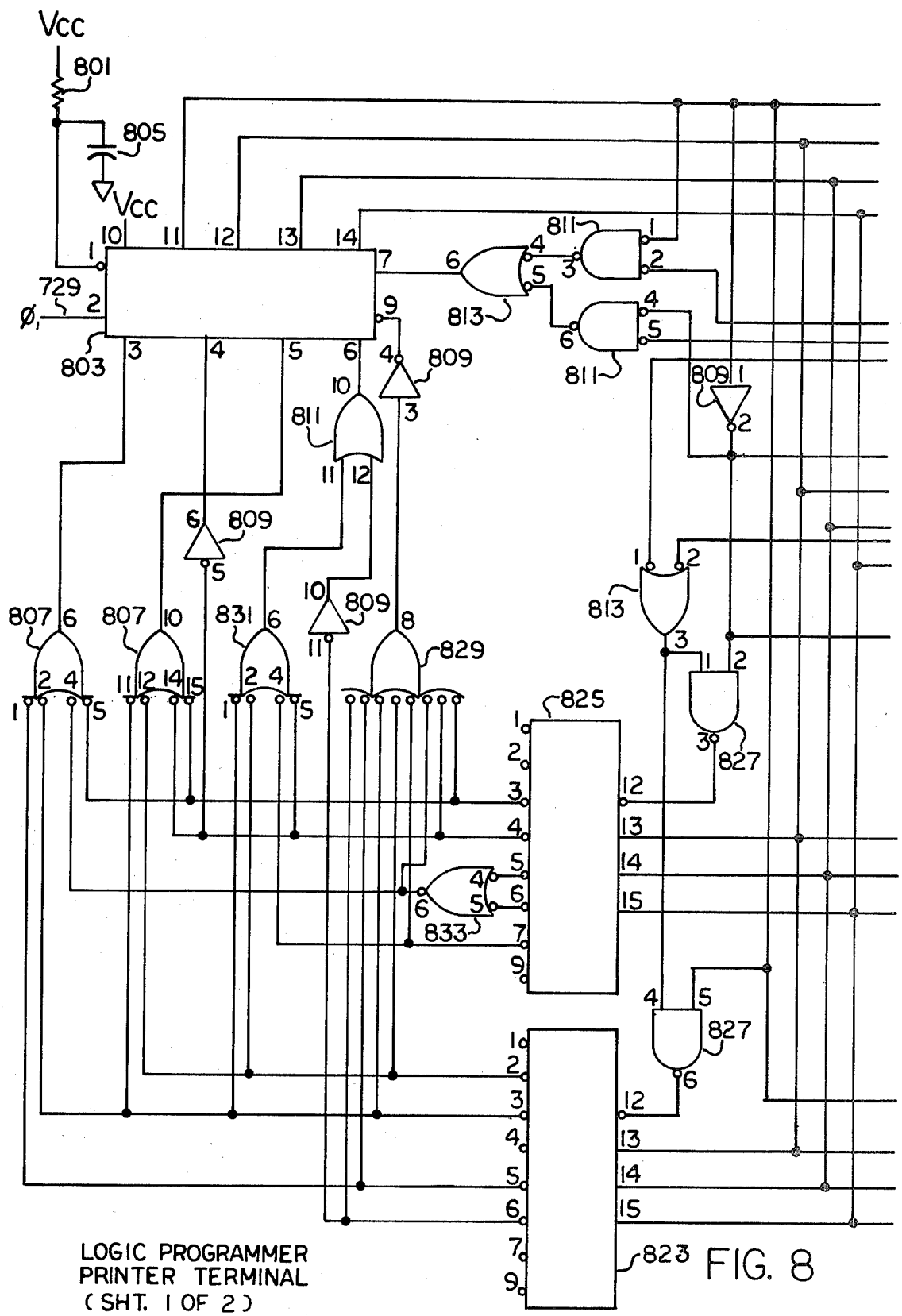
FIG. 8 is an electrical schematic diagram illustrating a first portion of the programmer of a printer terminal constructed according to the preferred embodiment of the present invention.
Figure 9:
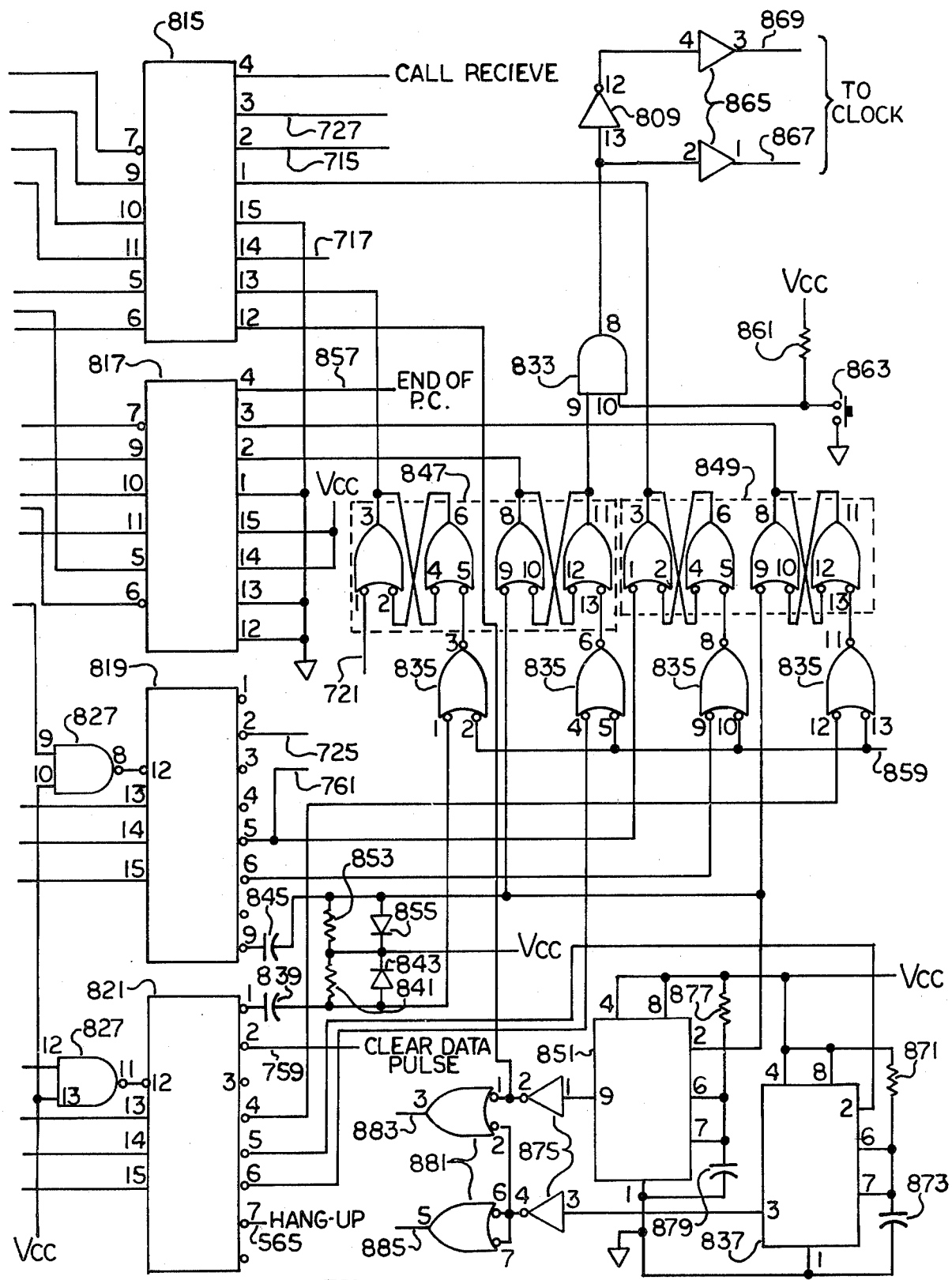
FIG. 9 is an electrical schematic illustrating a second portion of the programmer for the printer terminal.

FIGS. 8 and 9 taken together show an electrical schematic of the programmer unit of a printer terminal of the present invention. To be properly read, the right edge of FIG. 8 should be aligned with the left edge of FIG. 9 to form the complete schematic. The rest of this description describes both FIGS. 8 and 9.

One side of resistor 801, which is a 27,000 ohm 1% ¼-watt metal film resistor, is connected to Vcc. The other side of resistor 801 is connected to terminal 1 of integrated circuit 803, which is a 74C08, and through capacitor 805, which is a 37 MFD 1% 50 V electrolytic capacitor, to ground. Terminal 2 of integrated circuit 803 is connected to first clock line 729 from calculator chip 721 at FIG. 7. Terminal 3 of integrated circuit 803 is connected to terminal 6 of integrated circuit 807, which is a 74C20. Terminal 4 of integrated circuit 803 is connected to terminal 6 of integrated circuit 809, which is a 74C04. Terminal 5 of integrated circuit 803 is connected to terminal 10 of integrated circuit 807. Terminal 6 of integrated circuit 803 is connected to terminal 10 of integrated circuit 811, which is a 74C32. Terminal 9 of integrated circuit 803 is connected to terminal 4 of integrated circuit 809. Terminal 7 of integrated circuit 803 is connected to terminal 6 of integrated circuit 813, which is a 74C00.

Terminal 14 of integrated circuit 803 is connected to terminal 11 of integrated circuit 815, which is a 74C151, terminal 11 of integrated circuit 817, which is another 74C151 and terminal 15 of integrated circuits 819, 821, 823 and 825, all of which are 74C42. Terminal 13 of integrated circuit 803 is connected to terminal 10 of integrated circuit 815, terminal 10 of integrated circuit 817, and terminal 14 of integrated circuits 819, 821, 823, and 825. Terminal 12 of integrated circuit 803 is connected to terminal 9 of integrated circuits 815 and 817 and to terminal 13 of integrated circuits 819, 821, 823, and 825. Terminal 11 of integrated circuit 803 is connected to terminal 7 of integrated circuit 815, to terminal 1 of integrated circuit 811, and to terminal 1 of integrated circuit 809. Terminal 10 of integrated circuit 803 is connected to Vcc.

Terminal 4 of integrated circuit 813 is connected to terminal 3 of integrated circuit 811. Terminal 5 of integrated circuit 813 is connected to terminal 6 of integrated circuit 811. Terminal 2 of integrated circuit 811 is connected to terminal 5 of integrated circuit 815. Terminal 4 of integrated circuit 811 is connected to terminal 2 of integrated circuit 809 and terminal 7 of integrated circuit 817. Terminal 5 of integrated circuit 811 is connected to terminal 5 of integrated circuit 817. Terminal 1 of integrated circuit 813 is connected to terminal 6 of integrated circuit 815. Terminal 2 of integrated circuit 813 is connected to terminal 6 of integrated circuit 817. Terminal 3 of integrated circuit 813 is connected to terminals 1 and 4 of integrated circuit 827, which is a 74C00. Terminal 2 of integrated circuit 809 is connected to terminals 2 and 9 of integrated circuit 827. Terminal 3 of integrated circuit 827 is connected to terminal 12 of integrated circuit 825. Terminal 11 of integrated circuit 803 is connected to terminals 5 and 12 of integrated circuit 827. Terminal 6 of integrated circuit 827 is connected to terminal 12 of integrated circuit 823. Terminals 10 and 13 of integrated circuit 827 are connected to Vcc. Terminal 8 of integrated circuit 827 is connected to terminal 12 of integrated circuit 819. Terminal 11 of integrated circuit 827 is connected to terminal 12 of integrated circuit 821. A separate input of 8 input Nand circuit 829, which is a 74C30, is connected to terminals 6, 5, 3 and 2 of integrated circuit 823 and terminals 7, 4, and 3 of integrated circuit 825. The output of 8 input Nand Gate 829 is connected to terminal 3 of integrated circuit 809. Terminals 5 and 15 of integrated circuit 807 are connected to terminal 3 of integrated circuit 825. Terminal 14 of integrated circuit 807, terminal 5 of integrated circuit 809, and terminal 5 of integrated circuit 831, which is a 74C20, are connected to terminal 4 of integrated circuit 825. Terminal 6 of integrated circuit 833, which is a 74C08, is attached to one input of Nand Gate 827 and to terminal 4 of integrated circuit 807. Terminal 4 of integrated circuit 833 is connected to terminal 5 of integrated circuit 825. Terminal 5 of integrated circuit 833 is connected to terminal 6 of integrated circuit 825. Terminal 7 of integrated circuit 825 is connected to terminal 4 of integrated circuit 831. Terminal 2 of integrated circuit 823 is connected to terminal 2 of integrated circuit 831 and terminal 12 of integrated circuit 807. Terminal 3 of integrated circuit 823 is connected to terminals 2 and 11 of integrated circuit 807 and to terminal 1 of integrated circuit 831. Terminal 5 of integrated circuit 823 is connected to terminal 1 of integrated circuit 807. Terminal 6 of integrated circuit 823 is connected to terminal 11 of integrated circuit 809.

Terminal 7 of integrated circuit 821 is connected to hang-up line 565 from terminal 2 of integrated circuit 561 in FIG. 5, discussed above. Terminal 6 of integrated circuit 821 is connected to terminal 4 of integrated circuit 835, which is a 74C08. Terminal 5 of integrated circuit 821 is connected to terminal 2 of integrated circuit 837, which is a 555 timer. Terminal 4 of integrated circuit 821 is connected to terminal 12 of integrated circuit 835. Terminal 2 of integrated circuit 821 is connected to clear data pulse line 759 which comes from terminal 10 of integrated circuit 757 of FIG. 7, discussed above. Terminal 1 of integrated circuit 821 is connected through capacitor 839, which is a 0.001 MFD 1% 50 V capacitor, to one side of resistor 841, which is a 27,000 ohm ¼-watt 1% metal film resistor, to one side of diode 843, which is a 1N914, and to terminal 1 of integrated circuit 835. The other side of resistor 841 and diode 843 are connected to Vcc.

Terminal 9 of integrated circuit 819 is connected through capacitor 845, which is a 0.001 MFD 1% 50 V capacitor, to terminal 9 of integrated circuit 847, which is a 74C00, to terminal 9 of integrated circuit 849, which is also a 74C00, and to terminal 2 of integrated circuit 851, which is a 555 timer. Terminal 9 of integrated circuit 847 also attaches to one side of resistor 853, which is a 27,000 ohm 1% ¼-watt metal film resistor, and to one side of diode 855, which is a 1N914. The other side of resistor 853 and diode 855 are connected to Vcc. Terminal 5 of integrated circuit 819 is connected to terminal 1 of integrated circuit 849 and to line 761 coming from terminal 9 of integrated circuit 757 on FIG. 7, discussed above. Terminal 2 of integrated circuit 819 is connected to line 725 from terminal 1 of integrated circuit 723 on FIG. 7, discussed above.

Terminals 12, 13 and 1 of integrated circuit 817 are connected both to ground and to terminal 15 of integrated circuit 815. Terminals 14 and 15 of integrated circuit 817 are connected to Vcc. Terminal 2 of integrated circuit 817 is connected to terminal 8 of integrated circuit 847. Terminal 3 of integrated circuit 817 is connected to terminal 8 of integrated circuit 849. Terminal 4 of integrated circuit 817 is connected to end of print cycle line 857 which is connected to print cycle line 857 on FIG. 13, discussed below.

Terminal 12 of integrated circuit 815 is connected to end of print cycle terminal 1 of integrated circuit 881. Terminal 14 of integrated circuit 815 is connected to terminal 3 of integrated circuit 847. Terminal 1 of integrated circuit 815 is connected to terminal 3 of integrated circuit 849. Terminal 2 of integrated circuit 815 is connected to line 715 from terminal 10 of integrated circuit 705 in FIG. 7, discussed above. Terminal 3 of integrated circuit 815 is connected to line 727, which is connected to line 727 terminating in terminal 6 of integrated circuit 723 in FIG. 7, discussed above. Terminal 4 of integrated circuit 815 is connected to the call-/received line which terminates at terminal 8 of integrated circuit 459 in FIG. 5, discussed above.

Terminals 2, 5, 10 and 13 of integrated circuit 835 is connected to power/on clear line 859 which runs to FIG. 13 and will be discussed below.

Terminal 2 of integrated circuit 847 is connected to terminal 6 of integrated circuit 847. Terminal 3 of integrated circuit 847 is connected to terminal 4 of integrated circuit 847. Terminal 8 of integrated circuit 847 is connected to terminal 12 of integrated circuit 847. Terminal 10 of integrated circuit 847 is connected to terminal 11 of integrated circuit 847.

Terminal 3 of integrated circuit 849 is connected to terminal 4 of integrated circuit 849. Terminal 2 of integrated circuit 849 is connected to terminal 6 of integrated circuit 849. Terminal 10 of integrated circuit 849 is connected to terminal 11 of integrated circuit 849. Terminal 8 of integrated circuit 849 is connected to terminal 12 of integrated circuit 849.

Terminal 3 of integrated circuit 835 is connected to terminal 5 of integrated circuit 847. Terminal 6 of integrated circuit 823 is connected to terminal 13 of integrated circuit 847. Terminal 8 of integrated circuit 835 is connected to terminal 5 of integrated circuit 849. Terminal 11 of integrated circuit 835 is connected to terminal 13 of integrated circuit 849.

Terminal 11 of integrated circuit 847 is connected to terminal 9 of integrated circuit 833. Terminal 10 of integrated circuit 833 is connected through resistor 861, which is a 27,000 ohm 1% ¼-watt metal film resistor, to Vcc. Terminal 10 of integrated circuit 833 is also directly connected to one contact of single pole momentary contact pushbutton switch 863. The other contact of switch 863 is grounded.

Terminal 8 of integrated circuit 833 is connected to terminal 13 of integrated circuit 809 and to terminal 2 of integrated circuit 865, which is a 74C906. Terminal 12 of integrated circuit 809 is connected to terminal 4 of integrated circuit 865. Terminal 1 of integrated circuit 865 is connected to clock output line 867, which is an input to the clock illustrated in connection with FIG. 11, below. Terminal 3 of integrated circuit 865 is connected to clock output line 869, which is input line 869 to the clock circuit described in connection with FIG. 11, below.

Terminals 4 and 8 of integrated circuit 837 is connected directly to Vcc and indirectly through resistor 871, which is a 27,000 ohm 1% ¼-watt metal film resistor, to terminals 6 and 7 of integrated circuit 837. Terminal 7 of integrated circuit 837 is connected through capacitor 873, which is a 1 MFD 10% 20 V electrolytic capacitor, to ground. Terminal 1 of integrated circuit 837 is connected directly to ground. Terminal 3 of integrated circuit 837 is connected to terminal 3 of integrated circuit 875, which is a 74C04.

Terminals 4 and 8 of integrated circuit 851 is connected directly to Vcc and indirectly through resistor 877, which is a 56,000 ohm 1% ¼-watt metal film resistor, to terminals 6 and 7 of integrated circuit 851 and to one side of capacitor 879, which is a 1 MFD 10% 20 V capacitor. The other side of capacitor 879 is connected to terminal 1 of integrated circuit 851 and to ground. Terminal 9 of integrated circuit 851 is connected to terminal 1 of integrated circuit 875. Terminal 2 of integrated circuit 875 is connected to terminal 12 of integrated circuit 815 and to terminal 1 of integrated circuit 881, which is a 74C00. Terminal 2 of integrated circuit 881 is connected to terminals 6 and 7 of integrated circuit 881 and terminal 4 of integrated circuit 875. Terminal 3 of integrated circuit 881 is connected to red ribbon output line 883, which is line 883 on FIG. 13 describing the printer interface unit, below. Terminal 5 of integrated circuit 881 is connected to advance paper line 885, which is line 885 on FIG. 13, which is discussed in connection with the printer interface unit, below.

FUNCTIONAL DESCRIPTION OF THE PROGRAMMER

The programmer controls all operations of the printer terminal of the present invention. It is a state counter designed to perform the following functions:
1. wait for an event;
2. go to next step;
3. jump on condition;
4. jump unconditional;
5. present function.

First the operation of the circuit will be discussed.

Integrated circuit 803 is a 4-bit counter that has a clock pulse train 729 applied continuously to terminal 2. The counter is enabled to count by a logic "1" input at terminal 7. When this terminal is high the counter counts clock pulses, when it is low, the counter waits. Terminal 9 is the load input. When this terminal is low, the next clock pulse will load the code on input terminals 3, 4, 5 and 6 into the counter. Terminal 1 is the clear input. The RC network formed by resistor 801 and capacitor 805 connected to this terminal clears counter 803 to the zero state when power is turned on.

Integrated circuit 815 and 917 are 8-line by 1-line multiplexers. These multiplexers are driven by counter 803 to form a 16-input multiplexer. The inputs to this multiplexer trigger events or conditional jumps. For example, if counter 803 is in the "zero" state, the zero input on multiplexer 815 would be selected, i.e. terminal 4. If this input is at a "1" level, then the multiplexers "Y" output, i.e. terminal 5 of multiplexer 815, would reflect this "1" output. As a result output terminal 3 of integrated circuit Nand Gate 811 would be "1" and output terminal 6 of integrated circuit 813 would be "0", so counter 803 would not count. Conversely, if in the preceding example terminal 4 of multiplexer 815 had been low, i.e. at a "0" logic level, as it would be if a call was received by the printer terminal, then counter 803 would be enabled and would move from state "0000" to state "0001", which selects input 1 of multiplexer 815, i.e. terminal 3. Likewise if this terminal is at a "1" logic level, the counter will wait and if it is at a "0" level, the counter will move to state "0010", i.e. terminal 2 would be selected on multiplexer 815.

Integrated circuits 825 and 823 are decoders that are driven by the output of state counter 803 and have a strobe input which is implemented through integrated circuit 827's terminals 3 and 6. Integrated circuit 827 is a dual 2-input Nand Gate that strobes decoders 825 and 823 in response to inputs from the mulitplexer. Integrated circuit 829 is an 8-input Or Gate whose inputs are connected to all the outputs of decoders 825 and 823 on which a "jump" is required. A high level on the multiplexer input enables the decoder. If a "jump" state is detected by decoders 825 or 823, then gate 829's output goes high and this places a logic "0" on terminal 9 of counter 803. This input causes the state counter to load the code presented at terminals 3, 4, 5, and 6. A low level on the multiplexer output to terminal 7 of counter 803 enables the counter only and the program advances to the next step. This implements the conditional jump.

An unconditional jump is implemented by connecting the selected multiplexer input to a high logic level and encoding the jump on the output of the jump decoder 825 and 823 for that state.

These capabilities are used to implement the operational program of the present invention.

EXAMPLE OF PROGRAM OPERATION

A program state of "0" indicates the unit is waiting for a call to be received. When a call is received, the 200 Hz ready signal is applied to the phone line and the program moves to step 1. In step 1 the unit waits for a key to be pressed, which is then decoded and presented to multiplexer input terminal 3. This causes the program to move to step 2. Here the program checks to determine if the key pressed was a numeric sign key (#). If it was the # key, then the program moves to step 3. Here the system checks to determine if the numeric sign key latch is set. If the latch is set, the program jumps to step 14 which hangs the unit up and then jumps to 0 and waits for a new call. This means the receiving unit is programmed to hang up if the # key on the Touch Tone TM phone connected to it is pressed twice. If the # key latch is not set, the program moves to step 4 which sets the number key latch, write or clear calculator circuit and jumps to step 1. Thus the # key has another function in the present invention, i.e. to clear data entered on that line if an error was made. Of course the # key latch is now set and if the # key is pressed again, the unit will disconnect as described above.

The programming unit is programmed to look for a asterick key (*) to be pressed next. As * key being pressed would cause an input to terminal 14 of multiplexer 815 on line 717. This causes the unit to activate the rest of the printer to print the time and date in red.

If a key is pressed the program moves to program step 2, which checks to see if the key is the numeric symbol key. If not, the program jumps to step 5 which checks to determine if the key pressed was the * key. If it wasn't the * key, the program jumps back to step 1. The unit ignores any other key at this time. If it was the * key, then the program moves to step 6, which checks if the data latch is set. If the data latch is set, this means that the time and date have already been printed and the data has been entered. If this has been printed, the * key causes the data to be printed. If the * key is pressed and no data has been entered, the programmer causes the printer to print the time and date in red.

If the data latch is not set, the program moves to step 7, which sets the clock latch. The clock latch connects the clock circuit output to the printer interface, sets the time/calendar latch, which makes the clock circuit read out the date, pulses the red ribbon on and waits for the red ribbon pulse to terminate. The program then moves to step 8, which clears the data latch and sets the print latch. Setting the print latch causes the printer to print the data presented, in this case the date. The program then waits at step 8 until the end of the print cycle and moves to step 9, which clears any data in the calculator chip and determines that the clock latch is set. If the clock latch is set, the program moves to step 10, which checks if the time/calendar latch is set. At this time the time/calendar latch will be set because the printer has only printed the date, so the program jumps to step 13, which clears the time/calendar latch. This switches the clock circuit into a mode such that it outputs the time.

The time/calendar latch also controls which columns are printed on the printer.

The date has now been printed, but not the time. Without advancing the paper, the program now jumps from step 13 to step 8, which again sets the print latch and waits for the end of the print cycle. The program then moves to step 9, which checks if the clock latch is set. The clock latch will be set at this time, so the program moves to step 10, which checks to determine if the time/calendar latch is set. In this case it will not be, since it was cleared at step 13 above. The program then moves to step 11, which clears the clock latch and moves the program to step 12, which advances the paper and clears the red ribbon. The program then jumps to step 1 to wait for a key to be pressed.

Data can now be entered and printed out by pressing the * key as follows:

When any data key, i.e., a number key on the telephone, is pressed and the digit is stored in the calculator chip, the programmer detects that a key has been pressed and moves to step 2 of the program. Since the key pressed wasn't the # key, the program jumps to step 5. Since the key pressed wasn't the * key, the program jumps to step 1. The data latch was set when the data key was pressed. This loop is repeated until all data is entered for this line. The operator then presses the * key to print the data.

Pressing the * key causes the program to move to step 2, then to step 5 where the # key is detected so the program moves to step 6. The data latch is set so the program jumps to step 8, where the print latch is set to start the print cycle and the data latch is cleared. The program waits for the print cycle to be completed and then moves to step 9, which clears the data in the calculator chip and checks that the clock latch was set. The clock latch is not set at this time because it was cleared at step 11 of the print/time/date cycle, so the program jumps to step 12, which advances the paper and ribbon and then jumps to 1 to wait for more data entry.

Clock

Figure 10:
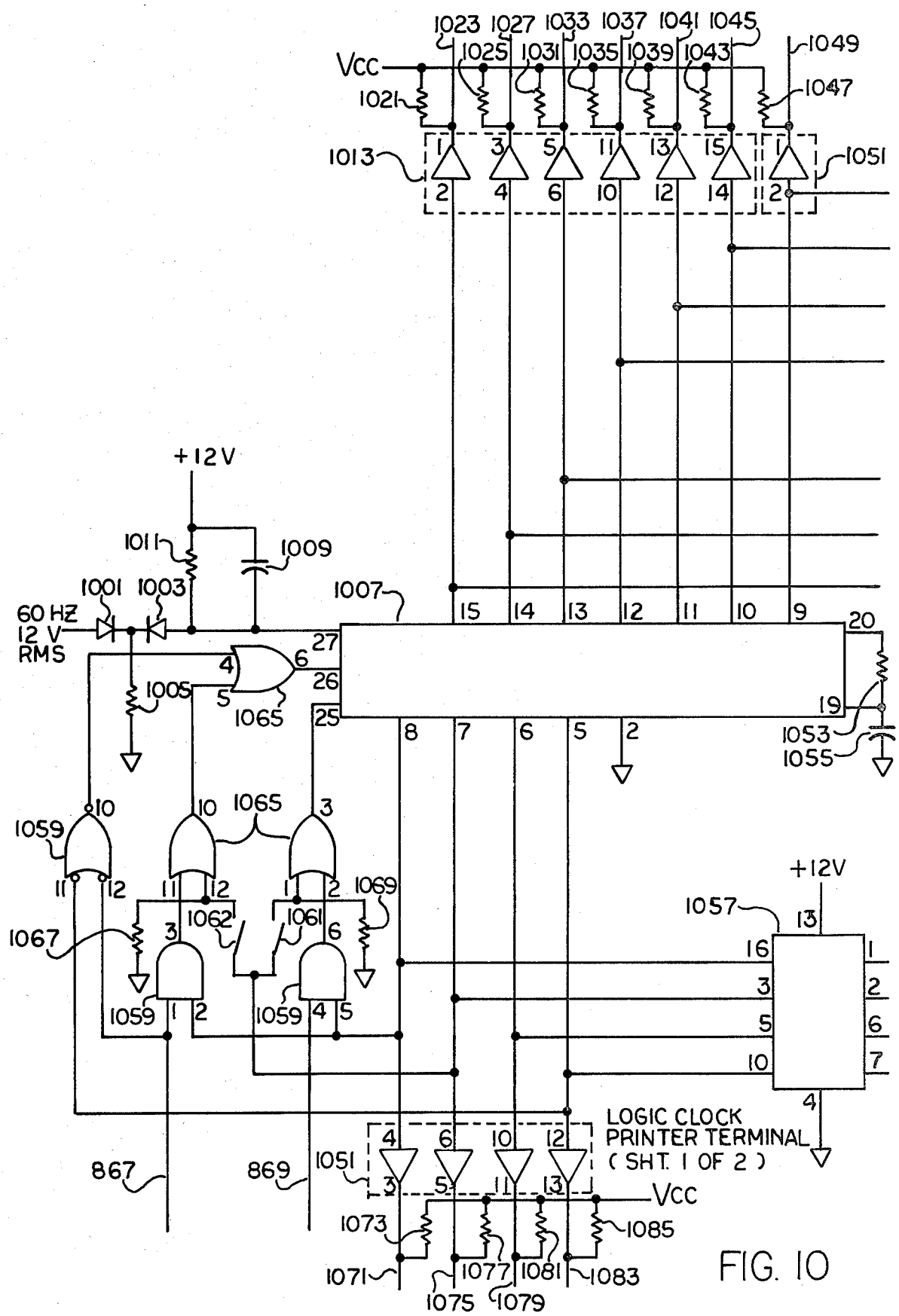
FIG. 10 is an electrical schematic illustrating a first portion of the clock circuitry of the printer terminal constructed according to the preferred embodiment of the present invention.
Figure 11:
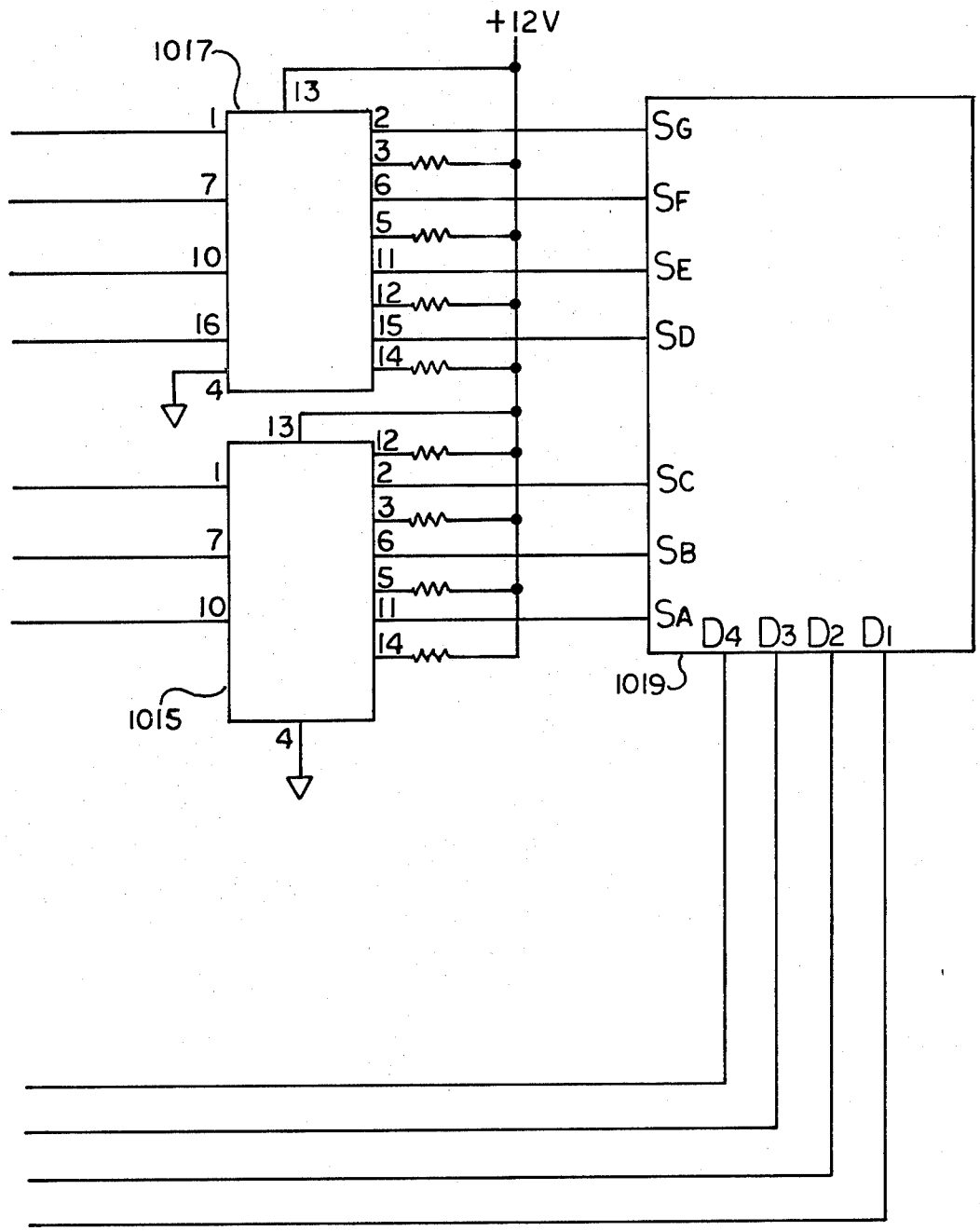
FIG. 11 is an electrical schematic illustrating a second portion of the clock circuitry of the printer terminal constructed according to the preferred embodiment of the present invention.

FIGS. 10 and 11, taken together, form an electrical schematic of the clock circuit of the printer terminal of the present invention.

One side of diode 1001 is connected to a source of 60 Hz 12 V AC power, not shown. The other side of the diode 1001 is connected directly to the reverse polarity and diode 1003, which, like diode 1001, is a 1N914, and indirectly, through resistor 1005, which is 510 ohm 5% ¼-watt carbon composition resistor, to ground. The other side of diode 1003 is hooked directly to terminal 27 of clock integrated circuit 1007, which is an NK-5019N, and indirectly to one side of capacitor 1009, which is a 0.1 MFD 10% 50 V capacitor, and to one side of resistor 1011, which is a 27,000 ohm 5% ¼-watt resistor. The other side of resistor 1011 and capacitor 1009 are connected to the +12 V output of the power supply.

Terminal 15 of integrated circuit 1007 is connected to terminal 2 of integrated circuit 1013, which is a 74C906, and to terminal 10 of integrated circuit 1015, which is a 75492 display driver. Terminal 14 of integrated circuit 1007 is connected to terminal 4 of integrated circuit 1013 and terminal 7 of integrated circuit 1015. Terminal 13 of integrated circuit 1007 is connected to terminal 6 of integrated circuit 1013 and terminal 1 of integrated circuit 1015. Terminal 12 of integrated circuit 1007 is connected to terminal 10 of integrated circuit 1013 and to terminal 16 of integrated circuit 1017, which is a 75492. Terminal 11 of integrated circuit 1007 is connected to terminal 12 of integrated circuit 1013 and terminal 10 of integrated circuit 1017. Terminal 10 of integrated circuit 1007 is connected to terminal 14 of integrated circuit 1013 and terminal 7 of integrated circuit 1017. Terminal 9 of integrated circuit 1007 is connected to terminal 2 of integrated circuit 1051, which is also a 74C906, and terminal 1 of integrated circuit 1017.

Terminal 13 of integrated circuits 1017 and 1015 are connected to the +12 V output side of the power supply. Terminal 4 of integrated circuits 1017 and 1015 are grounded. Terminals 3, 5, 12 and 14 of integrated circuit 1017 and 3, 5 and 14 of integrated circuit 1015 are connected, each through a separate 200 ohm 5% ¼-watt carbon composition resistor, to the +12 V output terminal of the power supply. Terminal 11 of integrated circuit 1015 is connected to the segment A input of a 4-digit display 1019. Terminal 6 of integrated circuit 1015 is connected to the segment B input of the display. Terminal 2 of integrated circuit 1015 is connected to the segment C input of the display. Terminal 15 of integrated circuit 1017 is connected to the segment D input of display 1019. Terminal 11 of integrated circuit 1017 is connected to the segment E input of display 1019. Terminal 6 of integrated circuit 1017 is connected to the segment F input of display 1019. Terminal 2 of integrated circuit 1017 is connected to the segment G input of integrated circuit 1019.

Terminal 1 of integrated circuit 1013 is connected directly to interface output line 1023 and indirectly through resistor 1021, which is a 27,000 ohm 5% ¼-watt carbon composition resistor, to Vcc. Terminal 3 of integrated circuit 1013 is connected directly to output line 1027 and indirectly through resistor 1025, which is a 27,000 ohm 5% ¼-watt carbon composition resistor, to Vcc. Terminals 5, 11, 13 and 15 of integrated circuit 1013 are connected directly to output lines 1033, 1037, 1041 and 1045, respectively, and through resistors 1031, 1035, 1039 and 1043, all of which are 27,000 ohm 5% ¼-watt carbon composition resistors, to Vcc.

Terminal 1 of integrated circuit 1051 is connected directly to output line 1049 and indirectly through resistor 1047, which is a 27,000 ohm 5% ¼-watt carbon composition resistor, to Vcc.

Terminal 20 of integrated circuit 1007 is connected through resistor 1053, which is a 12,000 ohm 5% ¼-watt carbon composition resistor, to terminal 19 of integrated circuit 1007. Terminal 19 of integrated circuit 1007 is connected through capacitor 1055, which is a 20 Pico Faraday 50 V 1% capacitor, to ground. Terminal 2 of integrated circuit 1007 is grounded. Terminal 5 of integrated circuit 1007 is connected to terminal 12 of integrated circuit 1051, to terminal 10 of integrated circuit 1057, which is a 75491, and to terminal 11 of integrated circuit 1059, which is a 74C08. Terminal 6 of integrated circuit 1007 is connected directly to terminal 10 of integrated circuit 1051 and to terminal 5 of integrated circuit 1057. Terminal 7 of integrated circuit 1007 is connected directly to terminal 3 of integrated circuit 1057, to terminal 6 of integrated circuit 1051, and to one side of momentary contact switch 1061 and momentary contact switch 1062. Terminal 8 of integrated circuit 1007 is connected to terminal 16 of integrated circuit 1057, to terminal 4 of integrated circuit 1051, and to terminals 5 and 2 of integrated circuit 1059.

Input line 869 from terminal 3 of integrated circuit 865 in FIG. 9 is connected to terminal 4 of integrated circuit 1059. Line 867 from terminal 1 of integrated circuit 865 in FIG. 9 is connected to terminals 1 and 12 of integrated circuit 1059. Terminal 6 of integrated circuit 1059 is connected to terminal 2 of integrated circuit 1065. Terminal 3 of integrated circuit 1059 is connected to terminal 11 of integrated circuit 1065. Terminal 12 of integrated circuit 1065 is connected directly to the other side of momentary contact switch 1062 and indirectly through resistor 1067, which is a 2,000 ohm 5% ¼-watt carbon composition resistor, to ground. Terminal 1 of integrated circuit 1065 is connected to the other side of momentary contact switch 1061 and indirectly through resistor 1069, which is a 2,000 ohm 5% ¼-watt carbon composition resistor, to ground. Terminal 3 of integrated circuit 1065 is connected directly to terminal 25 of integrated circuit 1007. Terminal 10 of integrated circuit 1065 is connected to terminal 5 of integrated circuit 1065. Terminal 10 of integrated circuit 1059 is connected to terminal 4 of integrated circuit 1065. Terminal 6 of integrated circuit 1065 is connected to terminal 26 of integrated circuit 1007.

Terminal 4 of integrated circuit 1057 is grounded. Terminal 13 of integrated circuit 1057 is connected to the +12 V regulated output from the power supply. Terminals 1, 2 6, and 7 of integrated circuit 1057 are connected to digit input D4, D3, D2, and D1 of display 1019, respectively.

Terminals 3, 5, 11, and 13 of integrated circuit 1051 are connected directly to output lines 1071, 1075, 1079, and 1078, respectively, and indirectly through resistors 1073, 1077, 1081, and 1085, respectively, all of which are 27,000 ohm 5% ¼-watt carbon composition resistors, to Vcc.

All output lines from this clock go to the printer interface unit described below in connection with FIGS. 12 and 13.

Printer Interface Unit

Figure 12:
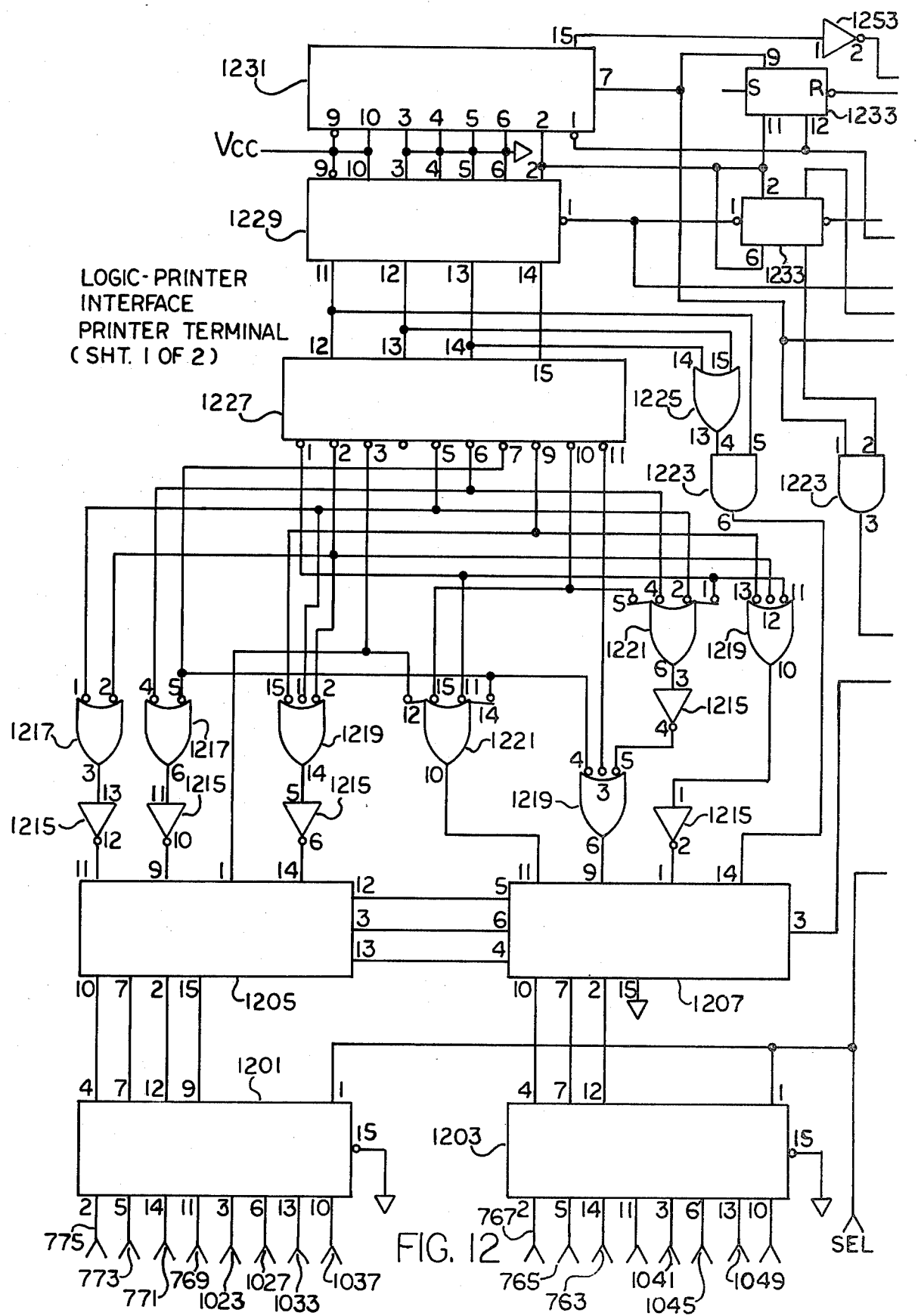
FIG. 12 is an electrical schematic illustrating a first portion of the printer interface of the printer terminal of the present invention.
Figure 13:
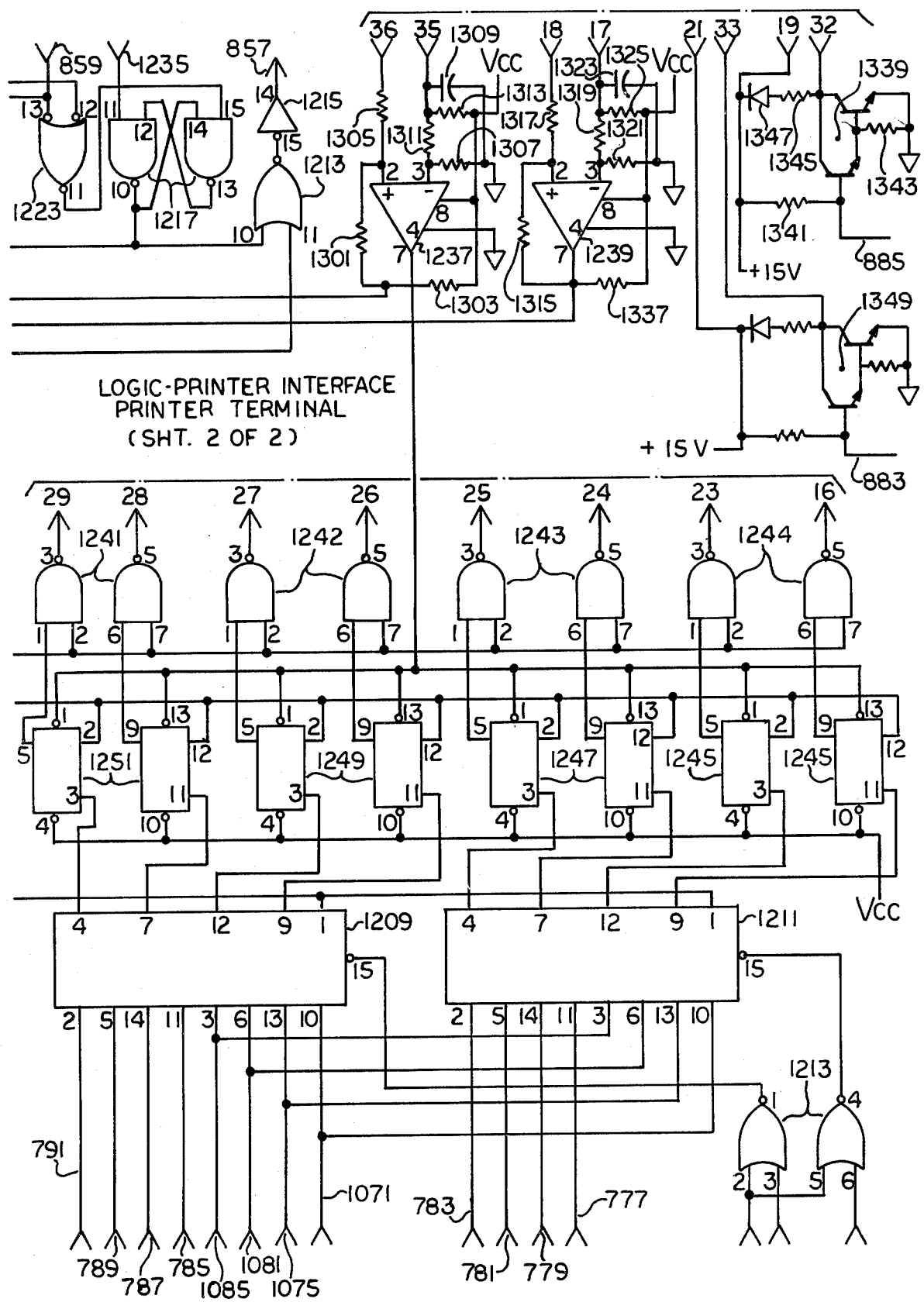
FIG. 13 is an electrical schematic detailing a second portion of the printer interface of a printer terminal constructed according to the present invention.

FIGS. 12 and 13 are an electrical schematic of the printer interface unit of the printer terminal of the present invention. The two figures must be read together to form the complete schematic. The right edge of FIG. 12 and the left edge of FIG. 13 should be aligned together to form the complete schematic. The description below refers to both figures.

Lines 769, 771, 773 and 775 from integrated circuit 721 in FIG. 7 are attached to terminals 11, 14, 5 and 2 of integrated circuit 1201, which is a 74C157. Lines 1023, 1027, 1033 and 1037 from integrated circuit 1013 in FIG. 10 are connected to terminals 3, 6, 13 and 10, respectively, of integrated circuit 1201. Terminal 15 of integrated circuit 1201 is connected to ground. Terminal 1 of integrated circuit 1201 is connected to input line SEL which is connected to the programmer. Terminals 4, 7, 12 and 9 of integrated circuit 1201 are connected directly to terminals 10, 7, 2 and 15 of integrated circuit 1205, which is a 74C85. Terminals 11, 9 and 14 of integrated circuit 1205 are connected to terminals 12, 10 and 6, respectively, of integrated circuit 1215, which is a 74C04. Terminal 1 of integrated circuit 1205 is connected to terminal 12 of integrated circuit 1221, which is a 74C20, and to terminal 3 of integrated circuit 1227, which is a 74C42. Terminals 13 and 11 of integrated circuit 1215 are connected to terminals 3 and 6, respectively, of integrated circuit 1217, which is a 74C00.

Terminal 5 of integrated circuit 1215 is connected to terminal 14 of integrated circuit 1219, which is a 74C10. Terminals 12, 3 and 13 and integrated circuit 1205 are connected directly to terminals 5, 6 and 4, respectively, of integrated circuit 1207, which is a 74C85.

Terminals 2, 5 and 14 of integrated circuit 1203 are connected to input lines 767, 765 and 763, respectively, from integrated circuit 721 on FIG. 7. Terminals 3, 6 and 13 of integrated circuit 1203 are connected to input lines 1201, 1205 and 1209, respectively, from the clock circuit in FIG. 10. Terminal 15 of integrated circuit 1203 is connected to ground. Terminal 1 of integrated circuit 1203 is connected to input SEL. Terminal 11 of integrated circuit 1207 is connected to terminal 10 of integrated circuit 1221. Terminal 9 of integrated circuit 1207 is connected to terminal 6 of integrated circuit 1219. Terminal 1 of integrated circuit 1207 is connected to terminal 2 of integrated circuit 1215. Terminal 14 of integrated circuit 1207 is connected to terminal 6 of integrated circuit 1223, which is a 74C08. Terminal 3 of integrated circuit 1207 is connected directly to terminals 2 and 12 of integrated circuits 1251, 1249, 1247 and 1245, all of which are 74C74s.

Terminal 1 of integrated circuit 1217 is connected to terminal 1 of integrated circuit 1219, terminal 5 of integrated circuit 1227, and terminal 2 of integrated circuit 1221. Terminal 2 of integrated circuit 1217 is connected to terminal 2 of integrated circuit 1219, terminal 2 of integrated circuit 1227, and to terminal 12 of integrated circuit 1219. Terminal 4 of integrated circuit 1217 is connected to terminal 6 of integrated circuit 1227 and to terminal 4 of integrated circuit 1221. Terminal 5 of integrated circuit 1217 is connected to terminal 7 of integrated circuit 1227, to terminal 14 of integrated circuit 1221, and to terminal 4 of integrated circuit 1219.

Terminal 15 of integrated circuit 1219 is connected to terminal 9 of integrated circuit 1227 and to terminal 13 of integrated circuit 1219. Terminal 15 of integrated circuit 1221 is connected to terminal 10 of integrated circuit 1227 and to terminal 5 of integrated circuit 1221. Terminal 11 of integrated circuit 1221 is connected to terminal 1 of integrated circuit 1227 and to terminal 11 of integrated circuit 1219.

Terminal 3 of integrated circuit 1219 is connected to terminal 11 of integrated circuit 1227. Terminal 5 of integrated circuit 1219 is connected to terminal 4 of integrated circuit 1215. Terminal 3 of integrated circuit 1215 is connected to terminal 6 of integrated circuit 1221. Terminal 1 of integrated circuit 1221 is connected to terminal 11 of integrated circuit 1219, to terminal 11 of integrated circuit 1221, and to terminal 1 of integrated circuit 1227. Terminal 1 of integrated circuit 1215 is connected to terminal 10 of integrated circuit 1219.

Terminal 12 of integrated circuit 1227 is connected to terminal 11 of integrated circuit 1229 and to terminal 5 of integrated circuit 1223. Terminal 13 of integrated circuit 1227 is connected to terminal 12 of integrated circuit 1229 and to terminal 15 of integrated circuit 1225. Terminal 14 of integrated circuit 1227 is connected to terminal 13 of integrated circuit 1229, to terminal 14 of integrated circuit 1225. Terminal 15 of integrated circuit 1227 is connected to terminal 14 of integrated circuit 1229.

Terminal 4 of integrated circuit 1223 is connected to terminal 13 of integrated circuit 1225. Terminals 9 and 10 of integrated circuits 1231 and 1229, both of which are 74C161s, are connected to Vcc. Terminals 3, 4, 5 and 6 of integrated circuits 1229 and 1231 are connected to ground. Terminal 2 of integrated circuits 1231 and 1229 are connected to terminals 11, 2 and 6 of integrated circuit 1233, which is a 74C74. Terminal 1 of integrated circuit 1231 is connected to terminal 12 of integrated circuit 1233, to terminals 10 and 14 of integrated circuit 1217, which is a 74C00 and to terminal 10 of integrated circuit 1213, which is a 74C02. Terminal 7 of integrated circuit 1231 is connected to terminal 9 of integrated circuit 1233, to terminal 1 of integrated circuit 1223, and to terminal 11 of integrated circuit 1213. Terminal 15 of integrated circuit 1231 is connected to terminal 1 of integrated circuit 1253, which is a 74C04. Terminal 1 of integrated circuit 1229 is connected to terminal 1 of integrated circuit 1233 and through resistor 1301, which is a 39,000 ohm 1% ¼-watt metal film resistor, to the noninverting input of first operational amplifier 1237, which is an LM311, and through resistor 1303, which is a 2,000 ohm 1% ¼-watt metal film resistor, to a terminal of op amp 1237 and to Vcc.

Integrated circuit 1233 is connected directly to terminal 2 of integrated circuit 1223. Integrated circuit 1233 is connected directly to the output of operational amplifier 1239, which is also an LM311.

Integrated circuit 1223 is connected directly to terminal 13 of integrated circuit 1233, which is a 74C08. Terminal 3 of integrated circuit 1223 is connected directly to terminals 2 and 7 of integrated circuits 1241, 1242, 1243 and 1244, all of which are DS3632N dual CMOS Drivers mounted 2 each to a 16 pin socket.

Data lines 791, 789, 787 and 785 from integrated circuit 721 in FIG. 7 are connected to terminals 2, 5, 14 and 11, respectively, of integrated circuit 1209, which is a 74C157. Input lines 1085, 1081, 1075 and 1071 from the clock described in FIG. 10 are connected to terminals 3, 6, 13 and 10, respectively, of integrated circuits 1209 and 1211, both of which are 74C157s. Input lines 783, 781, 779 and 777 are connected directly to terminals 2, 5, 14 and 11, respectively, of integrated circuit 1211. Terminal 15 of integrated circuit 1209 is connected to terminal 1 of integrated circuit 1213. Terminal 15 of integrated circuit 1211 is connected to terminal 4 of integrated circuit 1213. Terminals 4 and 7 of integrated circuit 1209 are connected to terminals 3 and 11, respectively, of integrated circuit 1251. Terminals 12 and 9 of integrated circuit 1209 are connected to terminals 3 and 11, respectively, of integrated circuit 1249.

Terminals 4 and 7 of integrated circuit 1211 are connected to terminals 3 and 11, respectively, of integrated circuit 1247. Terminals 12 and 9 of integrated circuit 1211 are connected to terminals 3 and 11 of integrated circuit 1245, respectively. Terminals 10 and 4 of integrated circuits 1251, 1249, 1247 and 1245 are connected directly to Vcc. Terminal 1 of integrated circuits 1209 and 1211 is connected to input SEL. Integrated circuits 1251, 1249, 1247 and 1245 are connected to the output of operational amplifier 1237.

Terminals 3 and 5 of integrated circuit 1241 are connected to terminals 29 and 28 of the printer, not shown, which is a Seiko model EP-101 printer. Terminals 3 and 5 of integrated circuit 1242 connect to printer terminals 27 and 26, respectively. Terminals 3 and 5 of integrated circuit 1243 are connected to printer terminals 25 and 24, respectively, and terminals 3 and 5 of integrated circuit 1244 connect to terminals 23 and 16 of the printer. The noninverting input of op amp 1237 is connected through resistance 1305, which is a 1,000 ohm 1% ¼-watt metal film resistor, to terminal 36 of the printer. The inverting input of operational amplifier 1237 is connected through resistor 1307, which is a 1,000 ohm 1% ¼-watt metal film resistor, to ground and to one side of capacitor 1309, which is a 39 MFD 1% 50 V electrolytic capacitor. The other side of capacitor 1309 is connected to terminal 35 of the printer. The inverting input of op amp 1237 is also connected through resistor 1311, which is 100 ohm 1% ¼-watt metal film resistor, to one side of resistor 1313, which is a 1,000 ohm 1% ¼-metal film resistor, and to terminal 35 of the printer. The other side of resistor 1313 is connected to Vcc.

Resistor 1315, which is a 39,000 ohm 1% ¼-watt metal film resistor, is connected between the output and the noninverting input of operational amplifier 1239. The noninverting input of operational amplifier 1239 is also connected through resistor 1317, which is a 1,000 ohm 1% ¼-watt metal film resistor, to terminal 18 of the printer. The inverting input of operational amplifier 1239 is connected to one side of resistor 1319, which is a 100 ohm 1% ¼-watt metal film resistor, and to one side of resistor 1321, which is a 1,000 ohm 1% ¼-watt metal film resistor. The other side of resistor 1319 is connected to printer input terminal 17. The other side of resistor 1321 is connected to ground. Terminal 17 of the printer connector is also connected through capacitor 1323, which is a 37 MFD 1% 50 V capacitor, to ground. Terminal 17 of the printer is also connected through resistor 1325, which is a 1,000 ohm 1% ¼- watt metal film resistor, to Vcc. Terminal 8 of operational amplifier 1239 is connected to Vcc. Terminal 4 of operational amplifier 1239 is connected to ground. The output of operational amplifier 1239 is connected through resistor 1337, which is a 2,000 ohm 1% ¼-watt metal film resistor, to Vcc.

Input line 885 from integrated circuit 881 of the programmer shown in FIG. 9 is connected to the base of the input transistor of Darlington pair 1339, which is a 2N2219, and through resistor 1341, which is a 3,900 ohm 1% ¼-watt metal film resistor, to terminal 19 of the printer and to the +15 V nonregulated power supply output. The emitter of the second transistor of Darlington pair 1339 is connected directly to ground and the base of the second transistor is connected through resistor 1343, which is a 100 ohm 1% ¼-watt metal film resistor, to ground. The collector of the second transistor of Darlington pair 1339 is connected through resistor 1345, which is a 10 ohm 1% ¼-watt metal film resistor, to one side of diode 1347, which is a 1N4001. The other side of diode 1347 is connected to terminal 19 of the printer.

Line 883 from terminal 3 of integrated circuit 881 in the programmer shown in FIG. 9 is electrically connected in a circuit identical to the circuit just described in connection with Darlington pair 1339, except that the output line from the collector of the second transistor of Darlington pair 1349 is connected to terminal 33 of the printer and the diode in the circuit connected with Darlington pair 1349 is connected to terminal 21 of the printer.

FUNCTIONAL DESCRIPTION OF THE PRINTER INTERFACE

Operationally, the Seco model EP-101 printer is a drum printer that prints up to 16 characters in up to 21 columns. The terminal described in connection with the preferred embodiment of the present invention uses only 8 columns of this terminal. The printer operates as follows:

For each column, 16 characters are located around the drum so that as the drum makes one revolution, each character passes by an electrically actuated hammer. The characters stand out on the drum and the paper and an inked ribbon is located between the drum and the hammer. When the character to be printed is behind the hammer, the correct hammer is actuated to press the ribbon against the paper with the character to be printed behind the paper. Pressure is applied only on the character that is printed on the paper.

Two electrical signals are generated by the printer when voltage is applied to the motor that rotates the drum. One is a reset pulse that occurs just before the character "0" is in position. This comes into the printer interface unit over connectors 36 and 35 into operational amplifier 1237. The other is a clock signal that occurs when the hammer should be energized for printing each character on the drum. This clock signal comes into the printer interface of the present invention through printer terminals 18 and 17 and operational amplifier 1239.

The printer interface stores the position of the drum as a 4-bit word in a 4-bit counter integrated circuit 1229. This counter is reset to zero by the reset pulse from the printer and is stepped by the clock output of the printer so the count in the counter always represents the drum position. The count stored in counter 1229 is encoded into 7-segment code that is identical to the code outputed by the calculator chip 721. This encoding function is performed by integrated circuits 1227, 1219, 1217 and 1221. The calculator chip scans all digits more than once during the time it takes the drum on the printer to rotate from one character to the next, i.e. 1/16th of a revolution. During this time the character represented by the counter is compared with every character stored in the calculator chip by comparators 1205 and 1207.

Dual flip-flops 1245, 1247, 1249 and 1251 represent the 8 columns to be printed and each enables the hammer drive circuitry. These flip-flops are clocked by the 8 digit lines from the calculator chip through integrated circuit 1209 and 1211. Each line is scanned for each count of the drum counter. As each column is compared, if they are the same, then the flip-flop is set to "1" that enables hammer driver gates 1241, 1242 1243 and 1244. A hammer driver pulse is generated by flip-flops 1233 and gate 1223. This pulse actuates all hammers that have "equal to" comparisons through integrated circuits 1241, 1242, 1243 and 1244 before the drum counter is advanced to the next count where the process is repeated. This process occurs 16 times for each rotation of the drum and allows any character to be printed in any column.

To start a print cycle, the programmer sets the "start print cycle" latch that starts the comparison process on the next character that comes up on the drum. A second 4-bit counter 1231 starts counting the comparison at this time and counts 16 comparisons before resetting the "start print cycle" latch indicating the end of the printer cycle. This additional counter prevents the necessity of waiting for the drum to reach reset position before starting the print cycle.

The printer is required to print the time of day and calendar date as well as stored data in the calculator circuit. The time and date are generated by a clock circuit shown in connection with FIGS. 10 and 11. The clock circuit's output is multiplexed in a manner similar to the calculator circuit except only 4 digits are displayed. Also the clock circuit puts out only the time or date as commanded, but not both at the same time. Either the calculator circuit or the clock circuit is selected under the control of the programmer by input multiplexers 1209 and 1211 and 1201 and 1203. Multiplexers 1209 and 1211 multiplex the digit strobe pulse and multiplexers 1201 and 1203 multiplex the 7-segment data between the calculator circuit and the clock circuit. Pin 1 on each of these multiplexer circuits is operated by the clock latch on the programmer. Since the clock circuit outputs only time, followed by the date on the same 4 digits, two rotations of the printer drum are used to print the time and date without advancing the paper. Paper is then advanced after these two print cycles. The red ribbon is also selected so the time and date are printed in red. These operations are controlled by the programmer that was discussed in connection with FIGS. 8 and 9, above.

SOURCE TERMINAL

Figure 14:
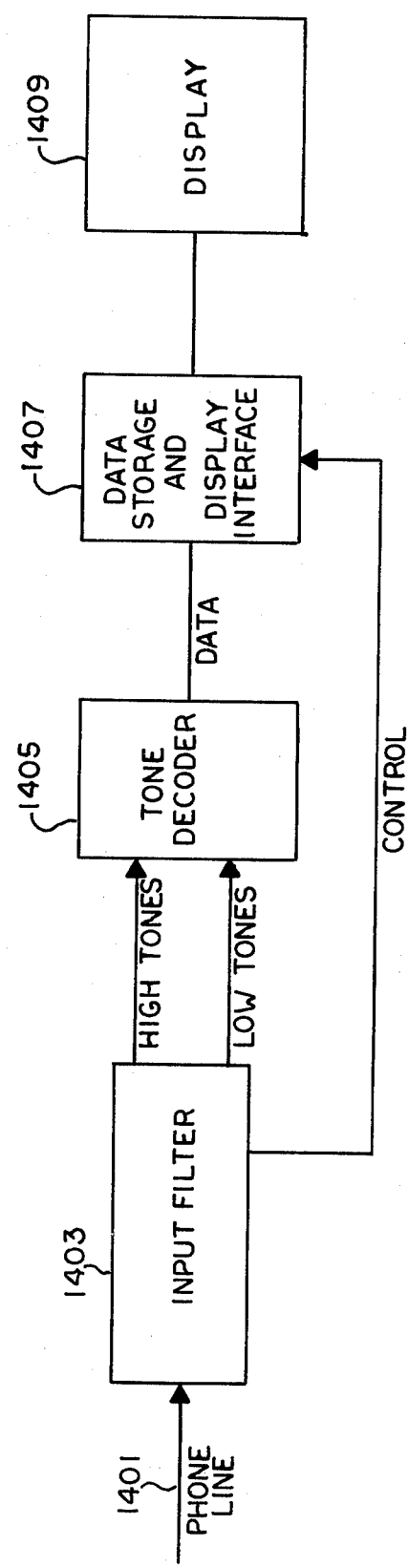
FIG. 14 is a block diagram showing the functional elements of a source terminal constructed according to the preferred embodiment of the present invention.

FIG. 14 is a functional block diagram illustrating the source terminal of the present invention.

Phone line 1401 inputs data to input filter 1403. Input filter 1403 separates out high tones, low tones, and control signals from the data impressed on the input phone line. The high tones and low tones go to tone decoder 1405, which functions exactly as the tone decoder in FIG. 6 of the printer unit described above. Data signals from tone decoder 1405 and control signals from input filter 1403 are fed as input to the data storage and display interface 1407 which decodes the data and, on demand, displays this data on display 1409.

Figure 15:
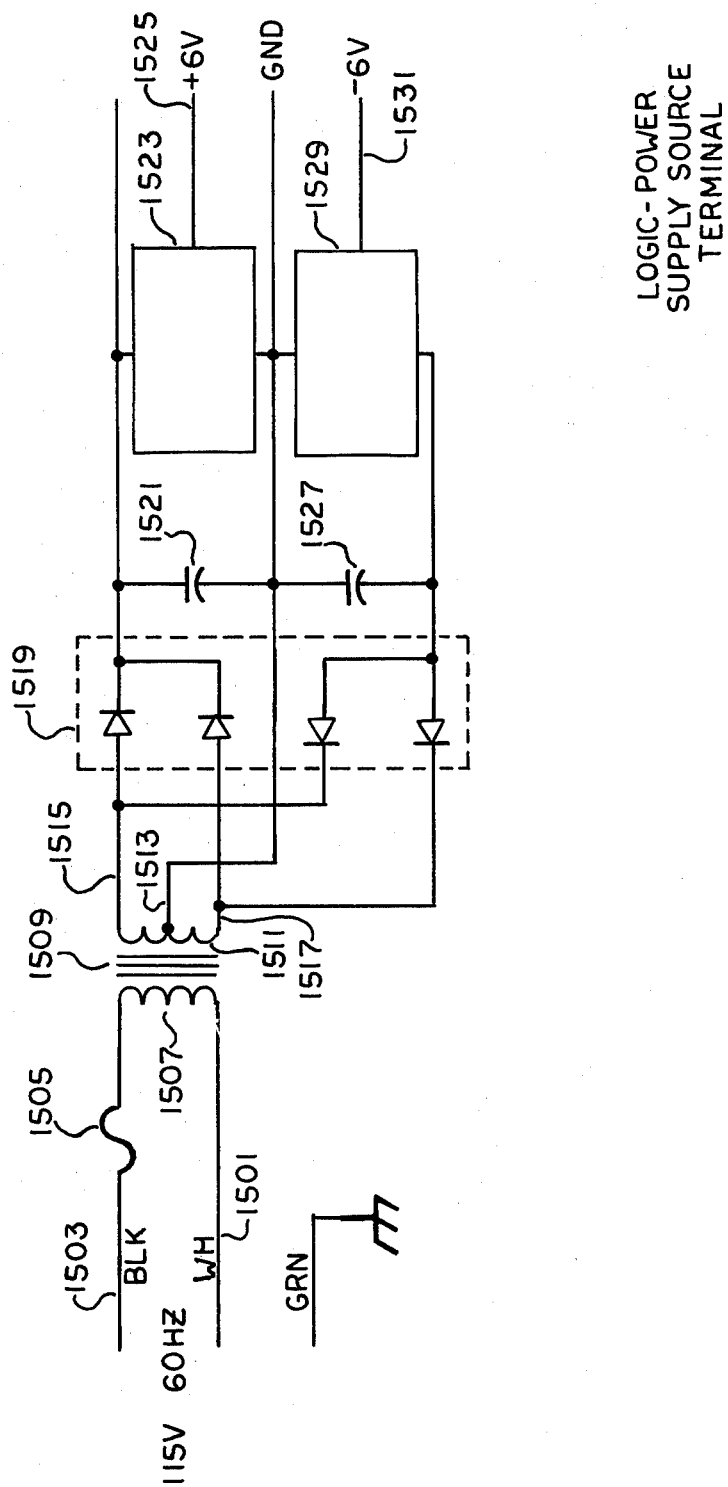
FIG. 15 is an electrical schematic illustrating the power supply of a source terminal constructed according to the present invention.

FIG. 15 is an electrical schematic of the power supply required to operate the source terminal constructed according to the preferred embodiment of the present invention.

Lines 1501 and 1503 are connected to a source of 115 V 60 Hz electric current, not shown. Line 1503 is connected through a 1 amp fuse 1505 to one side of the primary windings 1507 of transformer 1509, which is a Microtran 241-6-16. The other side of primary windings 1507 are connected to line 1501. Secondary 1511 of transformer 1509 is a center-tapped 20 V winding. Center-tap 1513 is grounded and high side 1515 and low side 1517 are connected to a bridge circuit 1519, which comprises 41N4002 rectifiers. High side 1515 is connected through capacitor 1521, which is a 2,000 Mfd 16 V electrolytic capacitor to ground. High side 1515 is also connected to the input of voltage regulator 1523, which is an LM340-6. The ground connection of the voltage regulator is grounded and output line 1525 is the regulated 16 V output of LM340-6. Low line 1517 is connected through capacitor 1527, which is a 100 Mfd 16 V electrolytic capacitor, to ground. Line 1517 is also connected to the input of voltage regulator 1529, which is a LM320-6. The ground connection of LM320-6 is connected to ground and its output, line 1531 is the minus 6 V output of the power supply.

Input Filter

Figure 16:
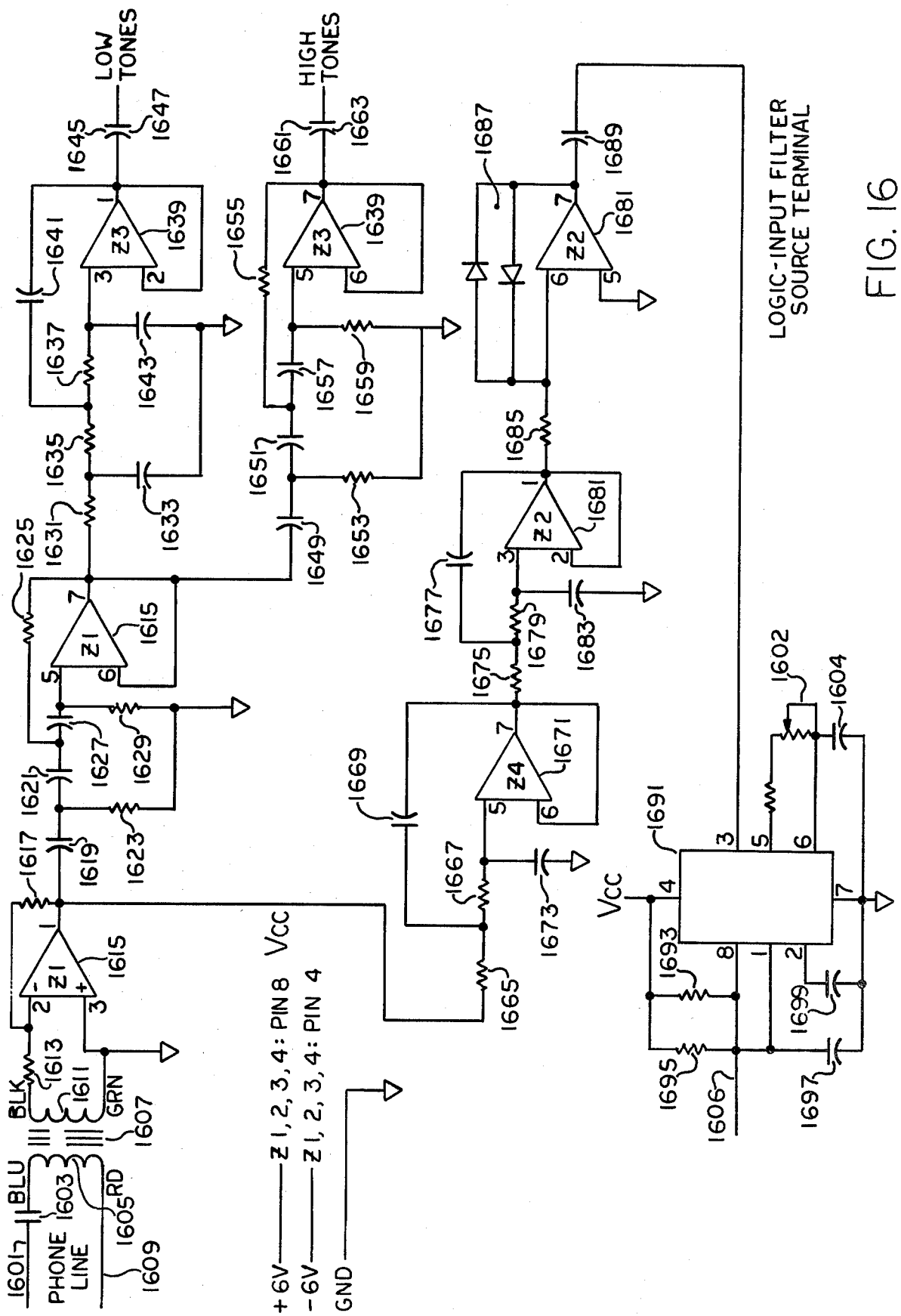
FIG. 16 is an electrical schematic illustrating the input filter circuitry of a source terminal constructed according to the present invention.

FIG. 16 is an electrical schematic diagram of the input filter of the source terminal of the present invention. High side 1601 of telephone line 1401 is connected through capacitor 1603, which is a 0.22 Mfd 10% 50 V capacitor, to the high side of primary 1605 of transformer 1607, which is a Microtran MT4. The low side of primary 1605 is connected to low side 1609 of telephone line 1401. The high side of secondary 1611 of transformer 1607 is connected through resistor 1613, which is a 15,000 ohm 1% ¼-watt metal film resistor, to terminal 2 which is the inverting input of operational amplifier 1615, which is an MC1558. The low side of secondary 1611 is connected to ground and to terminal 3 of integrated circuit 1615. Terminal 2 of integrated circuit 1615 is connected through resistor 1617, which is a 20,000 ohm 1% ¼-watt metal film resistor, to terminal 1, which is the output of the operational amplifier. Output terminal 1 of integrated circuit 1615 is connected through capacitor 1619, which is a 0.018 Mfd 1% 50 V capacitor to one side of capacitor 1621, which is also a 0.018 Mfd 1% 50 V capacitor, and to one side of resistor 1623, which is a 7,870 ohm 1% ¼-watt metal film resistor. The other side of resistor 1623 is connected to ground. The other side of capacitor 1621 is connected through resistor 1625, which is a 1,780 ohm 1% ¼-watt metal film resistor, to terminal 7 of integrated circuit 1615 and through capacitor 1627, which is a 0.018 Mfd 1% 50 V capacitor, to terminal 5 of integrated circuit 1615. Terminal 5 of integrated circuit 1615 is also connected through resistor 1629, which is a 154,000 ohm 1% ¼-watt metal film resistor, to ground. Terminal 6 of integrated circuit 1615 is connected to terminal 7 of integrated circuit 1615.

Terminal 7 of integrated circuit 1615 is connected to one side of resistor 1631, which is a 3.48 ohm 1% ¼-watt metal film resistor. The other side of resistor 1631 is connected to one side of capacitor 1633, which is a 0.1 Mfd 50 V 1% capacitor, and to one side of resistor 1635, which is also a 3.48 ohm 1% ¼-watt metal film resistor. The other side of capacitor 1633 is connected to ground. The other side of resistor 1635 is connected through resistor 1637, which is a 3.48 ohm 1% ¼-watt metal film resistor, to terminal 3 of integrated circuit 1639, which is an ML1558 operational amplifier; and through capacitor 1641, which is a 0.443 Mfd 1% 50 V capacitor, to terminal 1 of integrated circuit 1639. Terminal 2 of integrated circuit 1639 is connected to terminal 1 of integrated circuit 1639. Terminal 3 of integrated circuit 1639 is connected through capacitor 1643, which is a 0.005 Mfd 1% 50 V capacitor, to ground. Terminal 1 of integrated circuit 1639 is connected through capacitor 1645, which is a 2.2 Mfd 10% 20 V capacitor, to low tone output line 1647.

Terminal 7 of integrated circuit 1615 is connected through capacitor 1649, which is a 0.01 Mfd 1% 50 V capacitor to one side of capacitor 1651, which is a 0.01 Mfd 1% 50 V capacitor, and to one side of resistor 1653, which is a 6,490 ohm 1% ¼-watt metal film resistor. The other side of resistor 1653 is connected to ground. The other side of capacitor 1651 is connected through resistor 1655, which is a 1.47 ohm 1% ¼-watt metal film resistor to terminal 7 of integrated circuit 1639, and through capacitor 1657, which is a 0.01 Mfd 1% 50 V capacitor, to terminal 5 of integrated circuit 1639. Terminal 5 of integrated circuit 1639 is also connected through resistor 1659, which is a 127,000 ohm 1% ¼-watt metal film resistor, to ground. Terminal 6 of integrated circuit 1639 is connected to terminal 7 of integrated circuit 1639. Terminal 7 of integrated circuit 1639 is connected through capacitor 1661, which is a 2.2 Mfd 10% 20 V capacitor, to high tone output line 1663. Terminal 1 of integrated circuit 1615 is connected through resistor 1665, which is a 10,000 ohm 1% ¼-watt metal film resistor, to one side of resistor 1667, which is also a 10,000 ohm 1% ¼-watt metal film resistor, and through capacitor 1669, which is a 0.1 Mfd 5% 50 V capacitor, to terminal 7 of integrated circuit 1671, which is an MC1558. The other side of resistor 1667 is connected directly to terminal 5 of integrated circuit 1671 and through capacitor 1673, which is a 0.047 5% 50 V capacitor, to ground. Terminal 6 of integrated circuit 1671 is connected to terminal 7 of integrated circuit 1671. Terminal 7 of integrated circuit 1671 is connected through resistor 1675, which is a 10,000 ohm 1% ¼-watt metal film resistor, to one side of capacitor 1677, which is a 0.1 Mfd 5% 50 V capacitor, and to one side of resistor 1679, which is a 10,000 ohm 1% ¼-watt metal film resistor. The other side of capacitor 1677 is connected to terminal 1 of integrated circuit 1681, which is an MC1558. The other side of resistor 1679 is connected directly to terminal 3 of integrated circuit 1681 and through resistor 1683, which is a 0.047 Mfd 5% 50 V capacitor, to ground. Terminal 2 of integrated circuit 1681 is connected to terminal 1 of integrated circuit 1681. Terminal 1 of integrated circuit 1681 is connected through resistor 1685, which is a 1,000 ohm 1% ¼-watt metal film resistor, to one side of diode net 1687, which comprises two reverse polarity 1N910 diodes in parallel. The other side of diode net 1687 is connected to terminal 7 of integrated circuit 1681. The other side of resistor 1685 is connected to terminal 6 of integrated circuit 1681. Terminal 5 of integrated circuit 1681 is grounded. Terminal 7 of integrated circuit 1681 is connected through capacitor 1689, which is a 2.2 Mfd 10% 20 V capacitor, to terminal 3 of integrated circuit 1691, which is a 567. Terminal 4 of integrated circuit 1691 is connected directly to Vcc and indirectly through resistor 1693, which is a 2,000 ohm 1% ¼-watt metal film resistor, and resistor 1695, which is a 10,000 ohm 1% ¼-watt metal film resistor, to terminal 8 of integrated circuit 1691. Terminal 1 of integrated circuit 1691 is connected to terminal 8 of integrated circuit 1691 and through capacitor 1697, which is a 100 Mfd 20% 10 V capacitor, to ground. Terminal 2 of integrated circuit 1691 is connected through capacitor 1699, which is a 2.2 Mfd 10% 20 V capacitor, to ground. Terminal 7 of integrated circuit 1691 is connected directly to ground. Terminal 6 of integrated circuit 1691 is connected directly to one side of potentiometer 1602, which is a 10,000 ohm ½-watt potentiometer, and through capacitor 1604, which is a 1 Mfd 10% 20 V capacitor, to ground. Terminal 8 of integrated circuit 1691 is connected to an able output line 1606.

Functionally the data signals coming in on the phone line are amplified by integrated circuit 1615, separated into high and low tones by active filters whose outputs are a low tone output line 1647 and high output line 1663. This portion of the circuit operates the same as the circuitry discussed in connection with the printer unit described above. Integrated circuit 1671 and 1681 actively filter the high frequencies from the signal, pass it to tone decoder 1691, which senses the presence or absence of a 200 cycle note on the phone line. If the 200 cycle phone line is present, output enable line 1606 goes to a logic "1", or high output.

TONE DECODER

Figure 17:
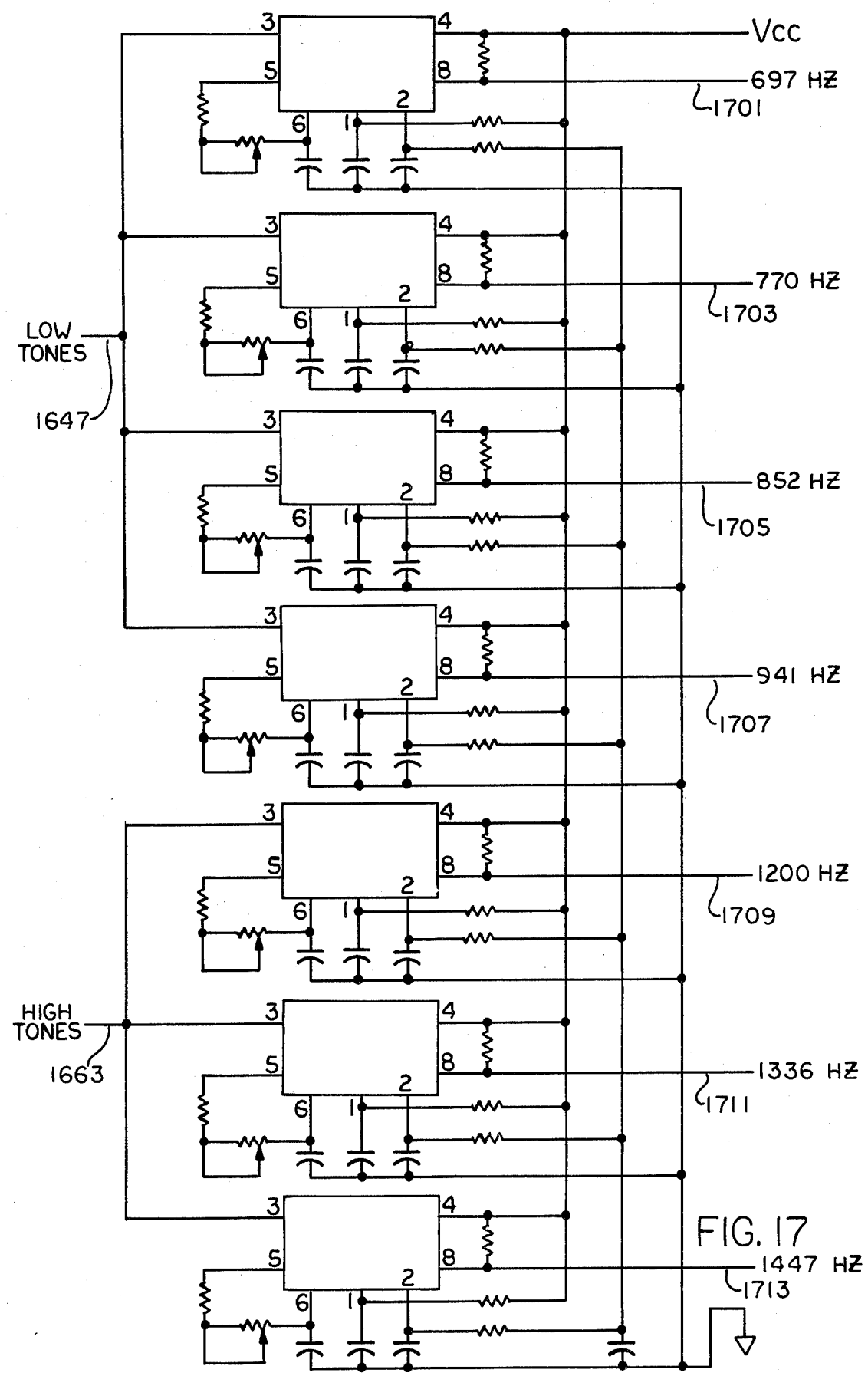
FIG. 17 is an electrical schematic illustrating the tone decoder portion of a source terminal constructed according to the preferred embodiment of the present invention.
Figure 18:
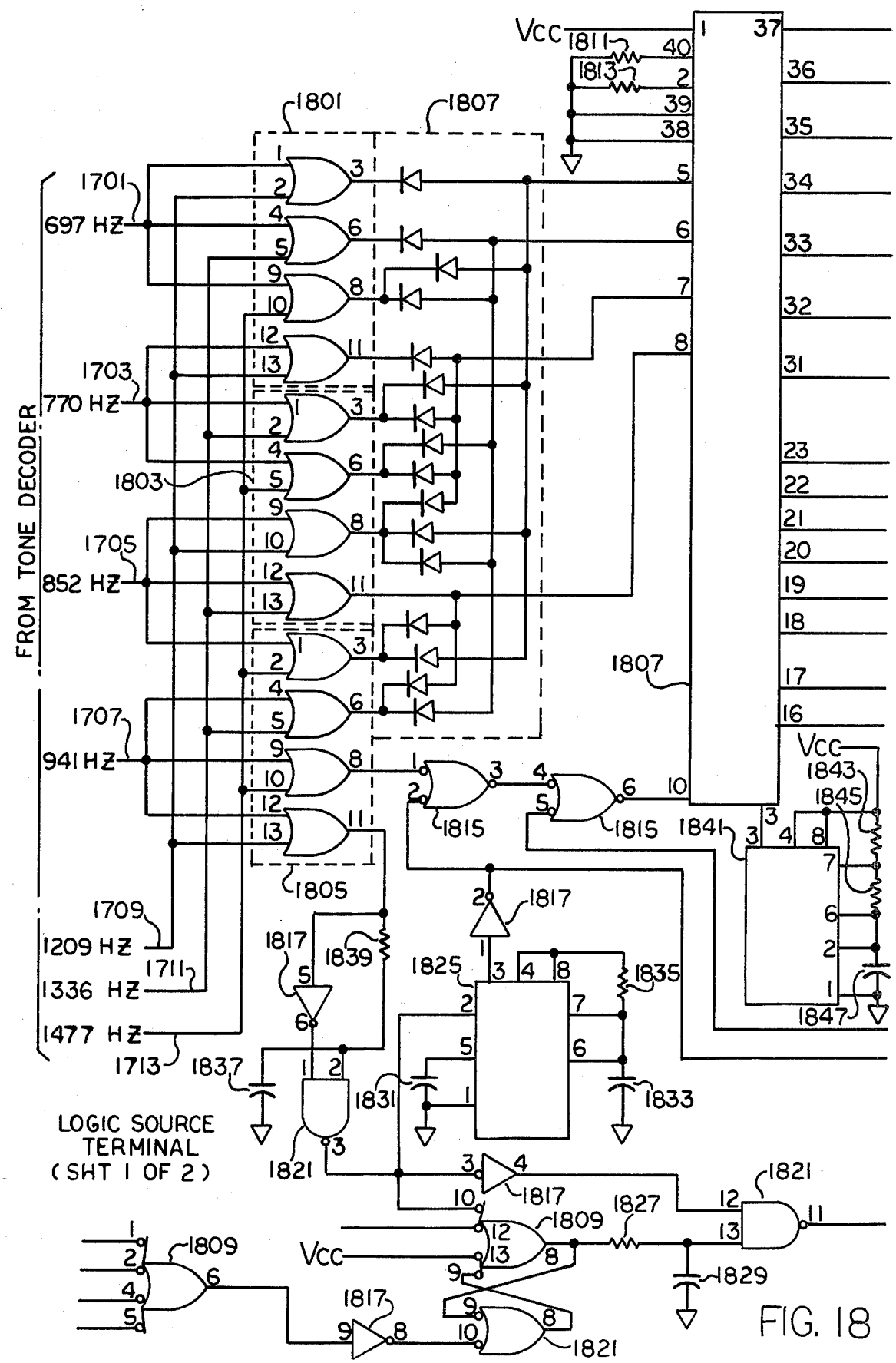
FIG. 18 is an electrical schematic of a first portion of the data storage and display circuitry of the source terminal constructed according to the present invention.
Figure 19:
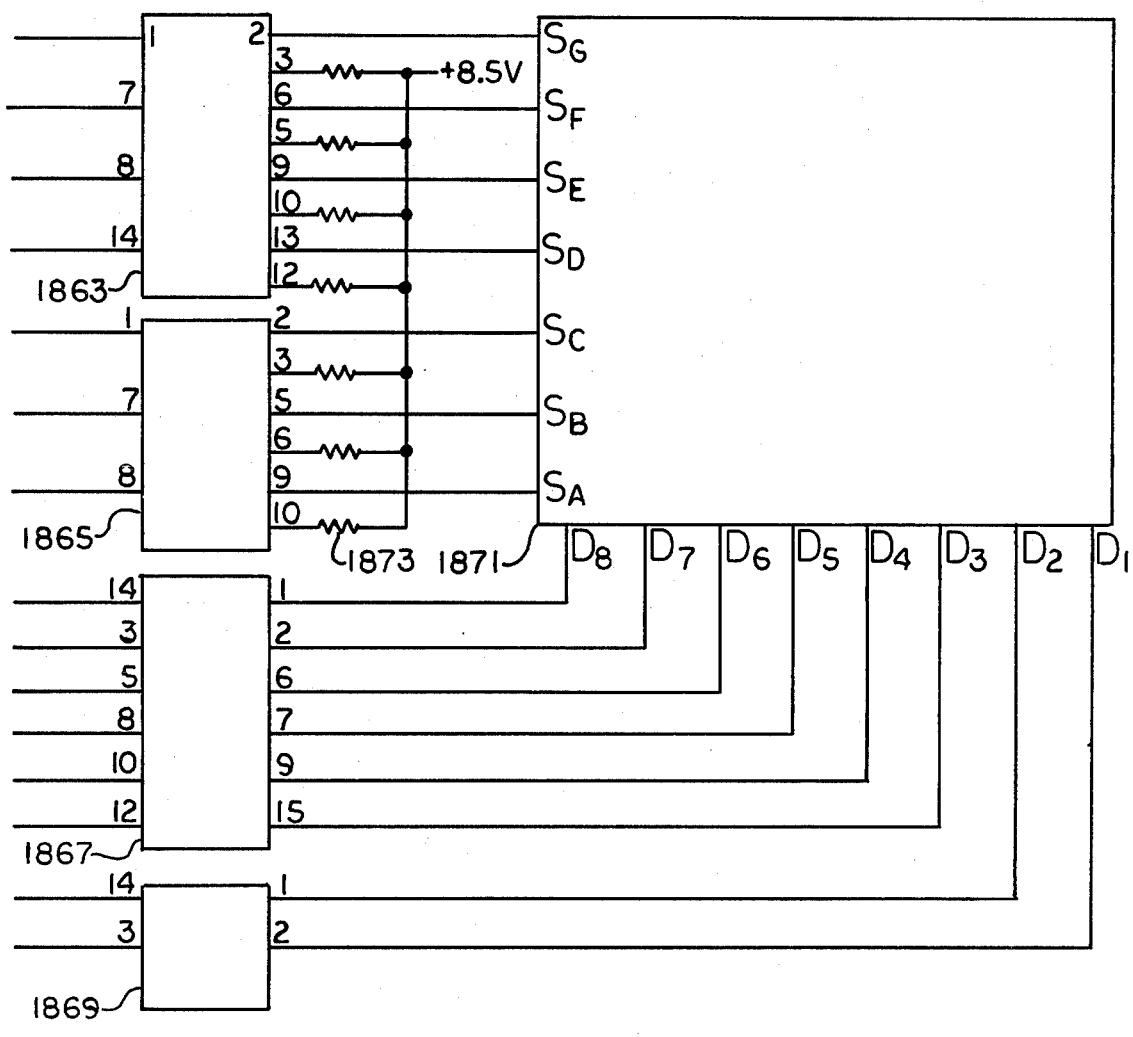
FIG. 19 is an electrical schematic showing the remainder of the data storage and display circuitry of a source terminal constructed according to the preferred embodiment of the present invention.
Figure 19:
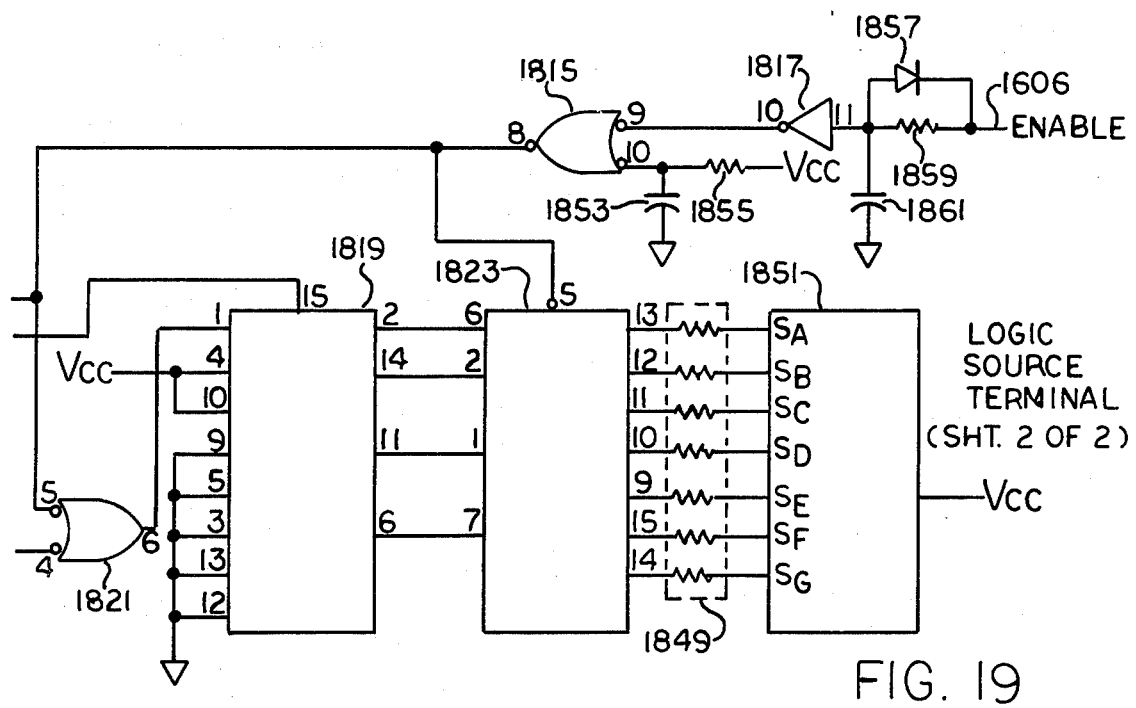

FIG. 17 is the electrical schematic of the tone decoder of the source terminal constructed according to the preferred embodiment of the present invention.

The tone decoder shown in FIG. 17 is functionally identical, except for the numbering of its input and output lines, to the tone decoder illustrated and described in connection with the tone decoder in the printer terminal shown in FIG. 6 above. Because this portion of the logic circuitry of the source terminal has been described completely above, the description will not be repeated, but the input and output lines have been numbered as shown in FIG. 17, so one skilled in the art will have an absolutely clear guide to their interconnection.

As in the tone decoder described in connection with the printer terminal, above, the low tones enter the tone decoder on line 1647 and the high tones enter the tone decoder on line 1663. After being discriminated by the phase lock loops of the decoder IC's, the presence of this 697 Hz output signal is made evident on output line 1701, the presence of a 770 Hz signal is output on line 1703, the presence of 1809 is connected to terminal 3 of integrated circuit 1817, to terminal 3 of integrated circuit 1821, and to terminal 2 of integrated circuit 1825, which is a 555 timer.

Terminal 4 of integrated circuit 1817 is connected to terminal 12 of integrated circuit 1821. Terminal 8 of integrated circuit 1809 is connected through resistor 1827, which is a 56,000 ohm 1% ¼-watt metal film resistor, to one side of capacitor 1829, which is a 0.1 Mfd 10% 50 V capacitor, and to terminal 13 of integrated circuit 1821. The other side of capacitor 1829 is connected to ground. Terminal 11 of integrated circuit 1821 is connected to terminal 4 of integrated circuit 1821.

Terminal 4 of integrated circuit 1817 is connected to terminal 12 of integrated circuit 1821.

Terminal 5 of integrated circuit 1825 is connected to one side of capacitor 1831, which is a 0.05 Mfd 1% 50 V capacitor. The other side of capacitor 1831 is connected to ground. Terminal 1 of integrated circuit 1825 is connected to ground. Terminal 6 of integrated circuit 1825 is connected through capacitor 1833, which is a 10 Mfd 10% 10 V capacitor, to ground. Terminals 4 and 8 of integrated circuit 1825 are connected through resistor 1835, which is a 36,000 ohms 1% ¼-watt metal film resistor, to terminals 7 and 6 of integrated circuit 1825. Terminal 3 of integrated circuit 1875 is connected to terminal 1 of integrated circuit 1817.

Terminal 2 of integrated circuit 1821 is connected through capacitor 1837, which is a 0.001 Mfd 10% 50 V capacitor, to ground; and through resistor 1839, which is a 56,000 ohm 1% ¼-watt metal film resistor, to terminal 5 of integrated circuit 1817 and terminal 1 of integrated circuit 1805.

Terminal 3 of integrated circuit 1807 is connected to terminal 3 of integrated circuit 1841, which is a 555 timer. Terminals 4 and 8 of integrated circuit 1841 are connected directly to Vcc and through resistor 1843, which is a 309 ohm 1% ¼-watt metal film resistor, to terminal 7 of integrated circuit 1841. Terminal 7 of integrated circuit 1841 is connected through resistor 1845, which is a 2,000 ohm 1% ¼-watt metal film resistor, to terminals 6 and 2 of integrated circuit 1841 and to one side of capacitor 1847, which is a 0.047 Mfd 10% 50 V capacitor. The other side of capacitor 1847 is connected to terminal 1 of integrated circuit 1841 and to ground.

Terminals 5, 3, 13 and 12 of integrated circuit 1819 are connected to ground. Terminals 4 and 10 of integrated circuit 1819 are connected to Vcc. Terminals 2, 14, 11 and 6 of integrated circuit 1819 are connected to terminals 6, 2, 1 and 7, respectively, of integrated circuit 1823.

Terminals 13, 12, 11, 10, 9, 15 and 14 of integrated circuit 1823 are connected through resistance network 1849, which comprises seven resistors each of which is a 510 ohm 1% ¼-watt metal film resistor, to segments A, B, C, D, E, F, and G, respectively, of display 1851. The common cathode connection of display 1851 is connected to Vcc.

Terminal 9 of integrated circuit 1815 is connected to terminal 10 of integrated circuit 1817. Terminal 10 of integrated circuit 1815 is connected through capacitor 1853, which is a 39 Mfd 1% 10 V capacitor, to ground. Terminal 10 of integrated circuit 1815 is also connected through resistor 1855, which is a 10,000 ohm 1% ¼-watt metal film resistor, to Vcc.

Terminal 11 of integrated circuit 1817 is connected to one side of diode 1857, which is a 1N914; to one side of resistor 1859, which is a 200,000 ohm 1% ¼-watt metal film resistor; and through capacitor 1861, which is a 39 Mfd 1% 10 V capacitor, to ground. The other side of resistor 1859 and diode 1857 are connected to enable input line 1606, which is connected to terminal 8 of integrated circuit 1691 shown in FIG. 16, above.

Terminals 37, 36, 35, and 34 of integrated circuit 1807 are connected to terminals 1, 7, 8 and 14, respectively, of integrated circuit 1863, which is a 25492. Terminals 33, 32 and 31 of integrated circuit 1807 are connected to terminals 1, 7 and 8 of integrated circuit 1865, which is a 75492. Terminals 23, 22, 21, 20, 19 and 18 of integrated circuit 1807 are connected to terminals 14, 13, 5, 8, 10 and 12 of integrated circuit 1867, which is a 75491. Terminals 17 and 16 of integrated circuit 1807 are connected to terminals 14 and 3 of integrated circuit 1869, which is a 75491.

Terminals 1 and 2 of integrated circuit 1869 are connected to common cathodes D1 and D2 of display 1871. Terminals 1, 2, 6, 7, 9 and 15 of integrated circuit 1867 are connected to common cathodes D8, D7, D6, D5, D4 and D3, respectively, of multielement display 1871. Display 1871 is an 8-digit 7-segment LED display, each segment of which may be a Litronix DL704.

Terminals 2, 6, 9 and 13 of integrated circuit 1863 are connected to common anodes of segments G, F, E and D, respectively, of display 1871. Terminals 3, 5, 10 and 12 of integrated circuit 1863 are connected through individual 47 ohm 1% ¼-watt metal film resistors 1873 to a source of 8.5 V DC power, not shown.

FUNCTIONAL DESCRIPTION OF SOURCE TERMINAL

Functionally, input transformer 1607 couples the telephone line to buffer amplifier 1615 which drives the tone separation filters, 1639 and the "ready" 200 Hz oscillator signal filter made up by 1671 and 1681. The low pass filter made up by integrated circuits 1671 and 1681 allows only the 200 Hz signal from the printer terminal through. This 200 Hz tone is then decoded by tone decoder 1691. Tone decoder 1691 enables, replaces a logic "1" at its enable output 1606.

Terminal 1 of integrated circuit 1379 is the output of a low pass filter and terminal 7 of integrated circuit 1639 is the output of a high pass filter. These filters are coupled through their respective coupling capacitors to the low tones and high tones output lines of the device.

The tone decoder shown in FIG. 17 is identical to the tone decoder in the printer terminal, which was discussed above.

The tone decoder outputs are encoded into binary coded decimal formats by integrated circuits 1801, 1803, 1805 and diode array 1807. This BCD output is the input to calculator chip 1807. Calculator chip 1807 stores the data as it is entered and displays the stored data on an 8-digit display 1871. Integrated circuits 1863, 1865, 1867 and 1869 are the display driver circuitry that interface the calculator chip to the display. Integrated circuit 1841 is a clock that strobes the logic of the calculator chip 1807.

Output 8 of integrated circuit 1815 is a "power on" clear circuit which clears the calculator chip when the enable line 1606 is high and the power is turned on. If a 200 Hz tone is not present, the enable input 1606 will be low and thus terminal 10 of integrated circuit 1807 will be low, which blanks the readout display.

The source terminal contains a line counter display 1851 which is driven by integrated circuits 1823 and 1819. Integrated circuit 1819 is the line counter and integrated circuit 1823 is the decoder driver for this display. If the enable input line 1606 is low, then the signal through input 5 of integrated circuit 1823 will blank the line counter display.

When the enable input is high at line 1606, the calculator chip displays "00" and the line counter displays a "1" for entry of the first line. If an asterisk key is then pushed integrated circuit 1805 produces a narrow pulse which triggers timer integrated circuit 1825, which operates as a one-shot multivibrator and clears the calculator circuit. If no numbers have been entered, the data latch comprising integrated circuits 1809 and 1821 is clear and the line counter is set to "1". This counter goes to "1", instead of to "0", because its input 4 is tied directly to Vcc.

If a number had been entered before the asterisk key was pressed, then the data latch formed by integrated circuits 1809 and 1821 would be high because this data latch is set by output 6 of integrated circuit 1809 whenever any data input is present. This means that the asterisk key would advance the line counter.

In the preferred embodiment of the present invention data can be entered and printed by pressing the asterisk key. This will cause the line counter to count each line entered. If the asterisk key is pressed twice without entering any data, the counter will reset to "1". The same action causes the printer at the printer terminal to print the time and date as has been previously described.

If the number sign (#) key is pressed, the data in the calculator chip will be cleared but the line counter display will not be affected. This allows data to be reentered if an error has been made.

The present invention is not intended to be limited to the precise embodiment described in the specification. The complexity of the present invention together with the requirements of clarity outlined in 35 U.S.C. § 112 require that an electric device be very specifically described, however, the present invention should be limited only by the appended claims and their legal equivalents.

I claim:
1. A recordkeeping apparatus comprising:
   a telephone incorporating a plurality of pushbutton controls, said telephone being capable of generating a specific audio signal when each pushbutton is depressed, said telephone further being connected by a communications line to a switched telecommunications system, said system controlling a plurality of communications lines,
   receiver means located at a situs remote from said telephone, connected to at least one said communication line and responsive to a sequential plurality of said audio signals for receiving and analyzing said plurality of audio signals to produce an output including internal data signals;
   control means responsive to the output of said receiver means for separating said internal data signals into internal character data signals and internal function data signals, storing a plurality of said internal character data signals, and capable of eliminating said stored internal character data signals in response to one or more of said internal function data signals;
   printer means for printing said stored internal character data signals as numbers and interface means for transmitting said internal character data signals to said printer means in response to one or more of said internal function data signals.

2. A recordkeeping apparatus as in claim 1 including clock means for providing time and date clock signals to said interface means in response to one or more of said internal function data signals,
   wherein said interface means transmits said time and date clock signals to said printer means in response to one or more of said internal function data signals to cause said printer means to print numbers corresponding to the time and data represented by the time and date clock signals.

3. A recordkeeping apparatus as in claim 2 including mode means connected to said control means for causing the printer means to automatically print said numbers corresponding to said time and date prior to the printing of the numbers represented by said stored internal character data signals.

4. A recordkeeping apparatus as in claim 2 wherein said internal function data signals include a signal representing a command that causes the printer means to print numbers representing the time and date.

5. A recordkeeping apparatus as in claim 1 including display means connected to said telephone and responsive to said sequential plurality of audio signals for displaying the numbers represented by the said audio signals.

6. A recordkeeping apparatus as in claim 5 wherein said receiver means includes a response means for applying a status signal to said communications line if the receiver means is actuated and said display means includes a reporting means responsive to the presence of said status signal for reporting that the receiver means is actuated.

7. A recordkeeping apparatus as in claim 6 wherein the operation of the display means is inhibited unless said status signal is detected by said reporting means.

8. A recordkeeping apparatus as in claim 1 wherein said pushbuttons are marked with the numbers "0" through "9" inclusive and the symbols "#" and "*" and wherein said internal character data signals represent the numbers "0" through "9" inclusive and said internal function data signals represent the functions "print", "clear internal character data storage" and "end message-disconnect".

9. A recordkeeping apparatus as in claim 8 wherein the specific audio signals generated by depressing a numbered pushbutton results in the production of an internal character data signal representing that number and the specific audio signals generated by depressing a symbolic pushbutton results in the production of an internal function data signal.

10. A recordkeeping apparatus as in claim 9 wherein said internal function data signals are generated according to the following table:

| Pushbutton(s) [Key ]Depressed | Internal Function Data[Control]Signal |
|---|---|
| ## | end message-disconnect |
| * (with no character data entered) | print time and date |
| * (with character data entered) | print character data |
| # | clear internal character data signal storage |

* * * * *